US012384426B1

(12) United States Patent
Iglesias et al.

(10) Patent No.: US 12,384,426 B1
(45) Date of Patent: *Aug. 12, 2025

(54) POSITIONAL GAPS FOR DRIVER CONTROLLABILITY

(71) Applicant: Waymo LLC, Mountain View, CA (US)

(72) Inventors: Jennifer Iglesias, San Francisco, CA (US); Diomidis Katzourakis, Mountain View, CA (US); Kerrie Wu, Fremont, CA (US); Bruce Lin, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 18/507,415

(22) Filed: Nov. 13, 2023

Related U.S. Application Data

(63) Continuation of application No. 17/865,535, filed on Jul. 15, 2022, now Pat. No. 11,851,092, which is a (Continued)

(51) Int. Cl.
*B60W 60/00* (2020.01)
*B60W 50/16* (2020.01)
*B62D 15/02* (2006.01)
*B60W 50/14* (2020.01)

(52) U.S. Cl.
CPC ........ *B60W 60/0053* (2020.02); *B60W 50/16* (2013.01); *B60W 60/001* (2020.02); *B62D 15/021* (2013.01); *B60W 2050/146* (2013.01)

(58) Field of Classification Search
CPC ........... B60W 60/0053; B60W 60/001; B60W 50/16; B60W 2050/146; B62D 15/021
See application file for complete search history.

(56) References Cited

U.S. PATENT DOCUMENTS 7,451,029 B2   11/2008   McLaren et al.
7,574,290 B2   8/2009    Gibson et al.
(Continued)

OTHER PUBLICATIONS

Dai, Yanyan, et al, Perception, Planning and Control for Self-Driving System Based on On-board Sensors, Advances in Mechanical Engineering, 2020, vol. 12(9), pp. 1-13.
(Continued)

*Primary Examiner* — Tan Q Nguyen
(74) *Attorney, Agent, or Firm* — Botos Churchill IP Law LLP

(57) ABSTRACT

The technology involves determining a minimum lateral gap distance between a vehicle configured for autonomous driving and one or more other objects in the vehicle's environment. The minimum lateral gap is used when determining whether to have a driver take over control of certain driving operations. This provides a measure of safety during disengagements or other change of control events. Determining the minimum lateral gap includes calculating a budgeted distance based on a cross-track error for a lateral position of the vehicle, an allowed actual gap distance to an object in the vehicle's environment, and a perception error associated with a location of the object in the vehicle's environment. This determination can be done for a set of possible operating speeds and steering rate limit combinations. The vehicle's control system may notify the driver to take control, for instance with audible, visual and/or haptic notifications.

20 Claims, 16 Drawing Sheets

Related U.S. Application Data continuation of application No. 17/122,006, filed on Dec. 15, 2020, now Pat. No. 11,427,226.

(56) References Cited

U.S. PATENT DOCUMENTS

| | | | |
|---|---|---|---|
| 8,180,514 | B2 | 5/2012 | Kaprielian et al. |
| 9,165,469 | B2 | 10/2015 | Bowers et al. |
| 9,776,632 | B2 * | 10/2017 | Bowers ............. B60W 30/0956 |
| 9,964,559 | B2 | 5/2018 | Zielke et al. |
| 10,780,914 | B2 | 9/2020 | Sights et al. |
| 2007/0219720 | A1 | 9/2007 | Trepagnier et al. |
| 2019/0027045 | A1 * | 1/2019 | Laur ...................... B60W 30/16 |
| 2019/0155280 | A1 | 5/2019 | Venkataramana |
| 2020/0086882 | A1 | 3/2020 | Kodali et al. |
| 2021/0094540 | A1 * | 4/2021 | Bagschik ................ G06V 20/58 |
| 2023/0222336 | A1 * | 7/2023 | Redford ................. G06N 20/00 706/20 |

OTHER PUBLICATIONS

Farag, Wael A., et al, Tuning of PID Track Followers for Autonomous Driving, 2018 International Conference on Innovation and Intelligence for Informatics, Computing, and Technologies (3ICT), 8 pp.

Gordon, Timothy, et al, Automated Driving and Autonomous Functions on Road Vehicles, Chalmers Univ. of Technology, Applied Mechanics, Gothenburg, Sweden, Mar. 7, 2015, 77 pp.

Gupta, Piyush, et al, Towards Safer Self-Driving Through Great PAIN (Physically Adversarial Intelligent Networks), Michigan State University, East Lansing, MI, Mar. 24, 2020, 18 pp.

Kuo, C.Y., et al, On the Image Sensor Processing for Lane Detection and Control in Vehicle Lane Keeping Systems, International Program on Energy Engineering, National Cheng Kung Univ., Tainan, Taiwan, Published Apr. 8, 2019, 10 pp.

Lv, Chen, et al, Analysis of Autopilot Disengagements Occurring During Autonomous Vehicle Testing, IEEE/CAA, Journal of Automatica Sinica, vol. 5, No., 1, Jan. 2018, pp. 58-68.

Politis, Ioannis, et al, Language-Based Multimodal Displays for the Handover of Control in Autonomous Cars, Glasgow Interactive Systems Group, University of Glasgow, Glasgow, UK, Sep. 1-3, 2015, 8 pp.

Wei, Junqing, et al, Towards a Viable Autonomous Driving Research Platform, Department of Electrical and Computer Engineering, Carnegie Mellon Univ., Pittsburg, PA, 2013, 8 pp.

Yalamanchi, Sai, et al, Long-term Prediction of Vehicle Behavior using Short-termand High-definition Maps, Uber Advanced Technologies Group, Jun. 13, 2020, 6 pp.

* cited by examiner

150

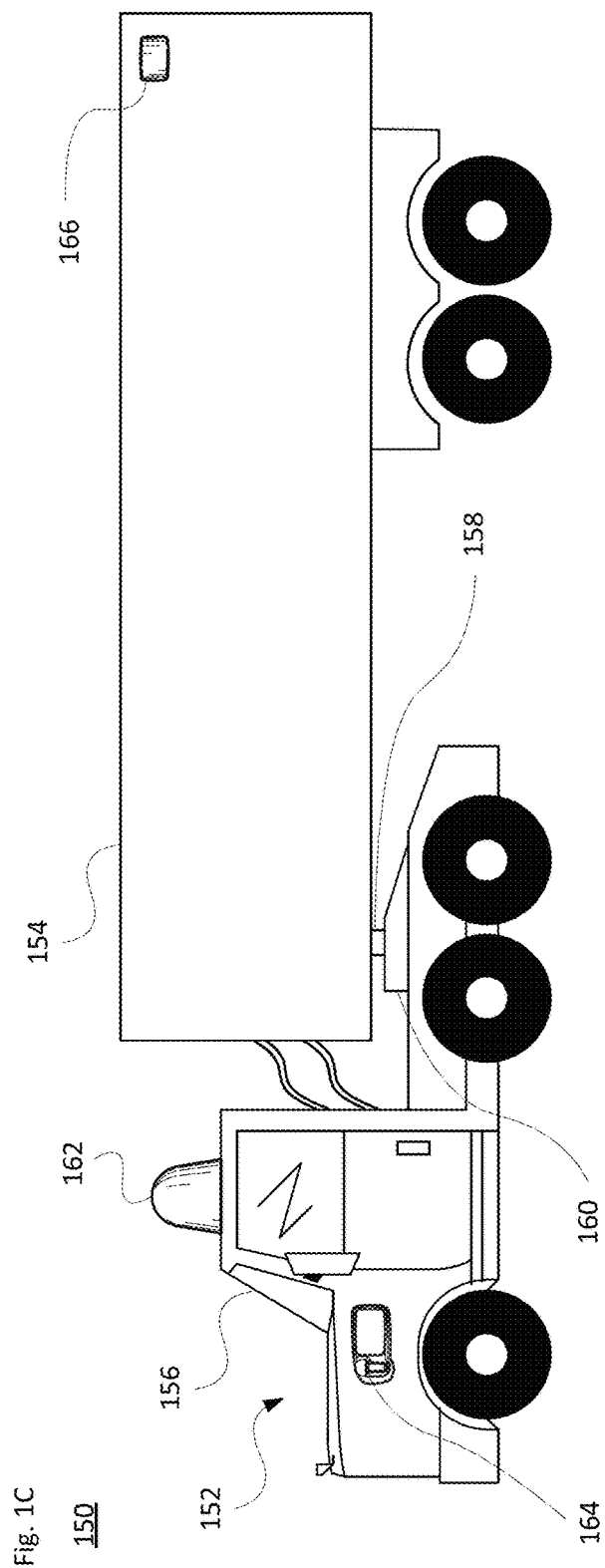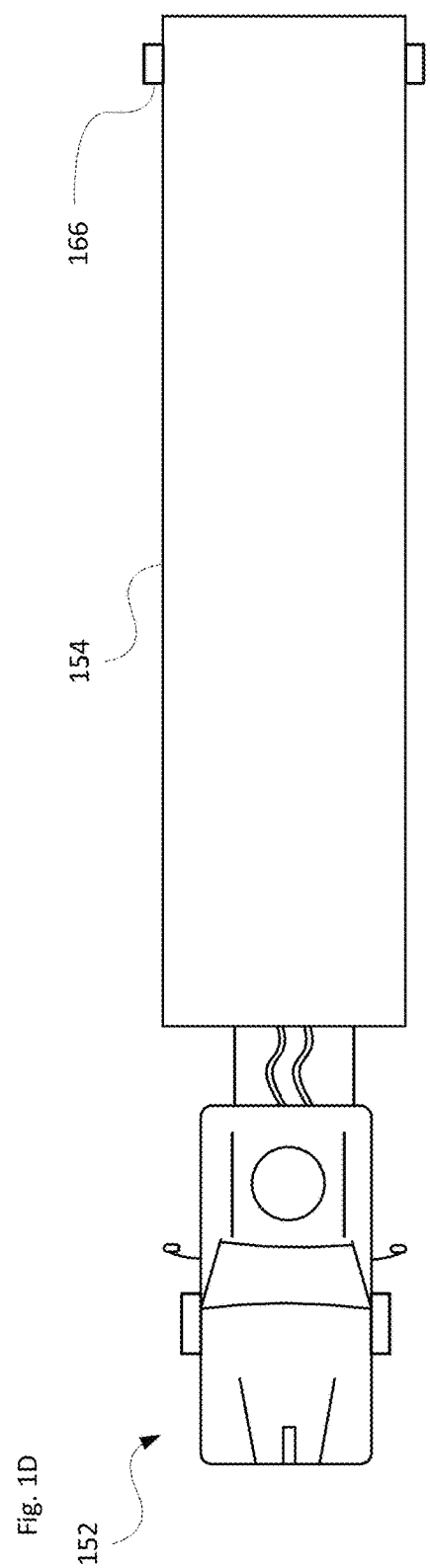

Fig. 5A

| | 2 mph | 5 mph | 10 mph | 15 mph |
|---|---|---|---|---|
| 0.215 rad/s | 0.04 | 0.07 | 0.15 | 0.22 |
| 0.322 rad/s | 0.05 | 0.11 | 0.25 | 0.38 |
| 0.387 rad/s | 0.06 | 0.14 | 0.33 | 0.50 |
| 0.430 rad/s | 0.07 | 0.16 | 0.39 | 0.60 |

Fig. 5B

| | 2 mph | 5 mph | 10 mph | 15 mph |
|---|---|---|---|---|
| 0.215 rad/s | 0.04 | 0.07 | 0.15 | 0.22 |
| 0.322 rad/s | 0.05 | 0.11 | 0.25 | 0.38 |
| 0.387 rad/s | 0.06 | 0.14 | 0.33 | 0.50 |
| 0.430 rad/s | 0.07 | 0.16 | 0.39 | 0.60 |

Fig. 5C

|             | 2 mph | 5 mph | 10 mph | 15 mph |
|-------------|-------|-------|--------|--------|
| 0.215 rad/s | 0.04  | 0.07  | 0.15   | 0.22   |
| 0.322 rad/s | 0.05  | 0.11  | 0.25   | 0.38   |
| 0.387 rad/s | 0.06  | 0.14  | 0.33   | 0.50   |
| 0.430 rad/s | 0.07  | 0.16  | 0.39   | 0.60   |

Fig. 5D

|             | 2 mph | 5 mph | 10 mph | 15 mph |
|-------------|-------|-------|--------|--------|
| 0.215 rad/s | 0.04  | 0.07  | 0.15   | 0.22   |
| 0.322 rad/s | 0.05  | 0.11  | 0.25   | 0.38   |
| 0.387 rad/s | 0.06  | 0.14  | 0.33   | 0.50   |
| 0.430 rad/s | 0.07  | 0.16  | 0.39   | 0.60   |

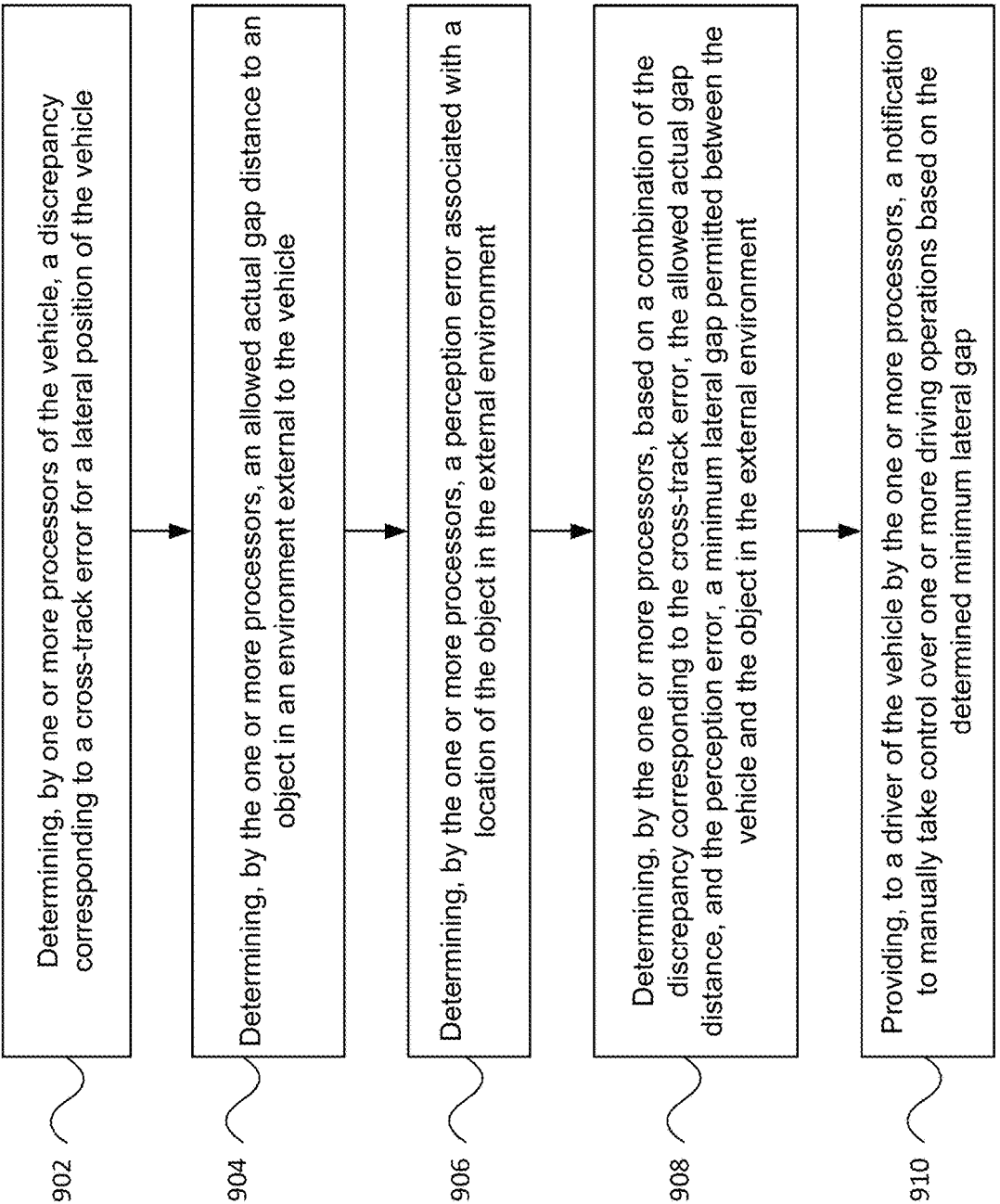

POSITIONAL GAPS FOR DRIVER CONTROLLABILITY

CROSS-REFERENCE TO RELATED APPLICATIONS

This application is a continuation of U.S. patent application Ser. No. 17/865,535, filed Jul. 15, 2022, which is a continuation of U.S. patent application Ser. No. 17/122,006, filed Dec. 15, 2020, now U.S. Pat. No. 11,427,226, the entire disclosures of which are incorporated by reference herein.

BACKGROUND

Vehicles that operate in an autonomous driving mode may transport passengers, cargo or other items from one location to another. In many instances, such vehicles may operate partially autonomously. This includes situations where a driver may have responsibility for certain driving operations while the vehicle's control system handles other operations, or other situations in which a person in the driver's seat may take control as warranted. This may occur when there is a test driver present, as the driver has the ultimate responsibility for taking control of the vehicle. Driver takeover of the vehicle can be challenging in various driving conditions, such as when there are stationary or moving vehicles or other objects adjacent to the vehicle or are in an upcoming path of the vehicle. In these conditions, it may be difficult for the driver to maintain the vehicle at least a minimum distance from those other objects.

BRIEF SUMMARY

The technology relates to determining a minimum lateral gap between a vehicle configured for some level of autonomous driving and other objects in the vehicle's environment. The minimum lateral gap is useful in partially autonomous driving situations, such as disengagements or other situations where a driver takes over control of certain driving operations. A goal is to enable the driver to be able to stay outside a planned lateral or other positional gap when taking over from the vehicle's control system. According to an aspect of the technology, a budgeted lateral gap is calculated based on a sum of potential uncertainties and a buffer. The potential uncertainties may include a perception error from the vehicle's on-board perception system and/or a cross-track error (CTE), which is derived from performance of the control system. Other uncertainties include map uncertainties, position estimate uncertainties, and behavior prediction uncertainties for other nearby objects. The buffer may be a speed-based buffer associated with a possible worst-case control maneuver.

According to one aspect of the technology, a method of operating a vehicle configured to operate in one or more autonomous driving modes is provided. The method comprises determining, by one or more processors of the vehicle, a discrepancy corresponding to a cross-track error for a lateral position of the vehicle; determining, by the one or more processors, an allowed actual gap distance to an object in an environment external to the vehicle; determining, by the one or more processors, a perception error associated with a location of the object in the external environment; determining, by the one or more processors, based on a combination of the discrepancy corresponding to the cross-track error, the allowed actual gap distance, and the perception error, a minimum lateral gap permitted between the vehicle and the object in the external environment; and providing, to a driver of the vehicle by the one or more processors, a notification to manually take control over one or more driving operations based on the determined minimum lateral gap.

Determining the minimum lateral gap further may include evaluating an overlap criterion based on a vehicle model of the vehicle. Here, the overlap criterion can be based on a mirror configuration for the vehicle.

Determining the minimum lateral gap may be performed for a set of possible speed and steering rate limit combinations. In this case, determining the minimum lateral gap performed for the set of possible speed and steering rate limit combinations may be based on at least one of vehicle wheelbase or lateral jerk. Determining the minimum lateral gap can include evaluating a table of possible speed and steering rate limit combinations.

The discrepancy corresponding to the cross-track error may be associated with a predetermined cross-track error percentile. In this case, the predetermined cross-track error percentile may be based on at least one of analytical simulation or historical performance data for one or more vehicles.

In an example, the perception error is variable according to a speed of the vehicle. In another example, providing the notification to the driver includes providing at least one of an audible, visual or haptic notification to the driver.

According to another aspect of the technology, a system is configured to enable operating a vehicle. The system comprises memory storing positional gap information associated with vehicle operation, and one or more processors operatively coupled to the memory. The one or more processors are configured to: determine a discrepancy corresponding to a cross-track error for a lateral position of the vehicle; determine an allowed actual gap distance to an object in an environment external to the vehicle; determine a perception error associated with a location of the object in the external environment; determine, based on a combination of the discrepancy corresponding to the cross-track error, the allowed actual gap distance, and the perception error, a minimum lateral gap permitted between the vehicle and the object in the external environment; and provide, to a driver of the vehicle, a notification to manually take control over one or more driving operations based on the determined minimum lateral gap.

In one example, determination of the minimum lateral gap further includes evaluation of an overlap criterion based on a vehicle model of the vehicle. Here, the overlap criterion can be based on a mirror configuration for the vehicle.

In another example, determination of the minimum lateral gap is performed for a set of possible speed and steering rate limit combinations. In a further example, determination of the minimum lateral gap includes evaluating a table of possible speed and steering rate limit combinations stored in the memory.

The discrepancy corresponding to the cross-track error may be associated with a predetermined cross-track error percentile. In this case, the predetermined cross-track error percentile can be based on at least one of analytical simulation or historical performance data for one or more vehicles of a set of vehicles. Also, the perception error may be variable according to a speed of the vehicle.

According to another aspect of the technology, a vehicle configured to operate in one or more autonomous driving modes is provided. The vehicle comprises: a driving system including a steering subsystem, an acceleration subsystem and a deceleration subsystem to control driving of the vehicle; a perception system including one or more sensors configured to detect objects in an environment external to the vehicle; a positioning system configured to determine a current position of the vehicle; and a control system including one or more processors. The control system is operatively coupled to the driving system, the perception system and the positioning system. The control system is configured to: determine a discrepancy corresponding to a cross-track error for a lateral position of the vehicle; determine an allowed actual gap distance to a given object in the environment external to the vehicle; determine a perception error associated with a location of the given object in the external environment; determine, based on a combination of the discrepancy corresponding to the cross-track error, the allowed actual gap distance, and the perception error, a minimum lateral gap permitted between the vehicle and the given object in the external environment; and provide, to a driver of the vehicle, a notification to manually take control over one or more driving operations based on the determined minimum lateral gap. In one example, the notification is selected from the group consisting of an audible notification, a visual notification, and a haptic notification.

BRIEF DESCRIPTION OF THE DRAWINGS

FIGS. 1C-D illustrate an example cargo-type vehicle configured for use with aspects of the technology.

FIGS. 5A-D illustrate examples of minimum planned lateral gaps for different object types in accordance with aspects of the technology.

FIG. 9 illustrates an example method in accordance with aspects of the technology.

DETAILED DESCRIPTION

In many partly autonomous situations, a human driver may take over control of driving operations from the vehicle's control system. This can include disengagements from vehicle-only operation. The control system may notify the driver to take control, for instance with audible, visual and/or haptic notifications. In these situations, there should be a minimal amount of clearance between the vehicle and nearby objects in the vehicle's surrounding environment. Determining this clearance includes calculating a budgeted lateral gap (or other positional gap) for a least restrictive gap. This can be done for a set of possible speed and steering rate limit combinations, and is based on the sum of distances associated with potential perception and cross-track errors, as well as a buffer for recovery. For instance, it may not be sufficient to just make sure that the human driver can take over before an object is collided with. Rather, there may be some buffer when the driver takes over, such that the driver is still comfortable maneuvering the vehicle. By way of example, it could be uncomfortable if the driver took over to come to a stop and ended up 1 cm from the other object. Here, there is no collision, but it would make it hard for the driver to maneuver and control the vehicle afterwards.

Example Vehicle Systems

Figure 1A:
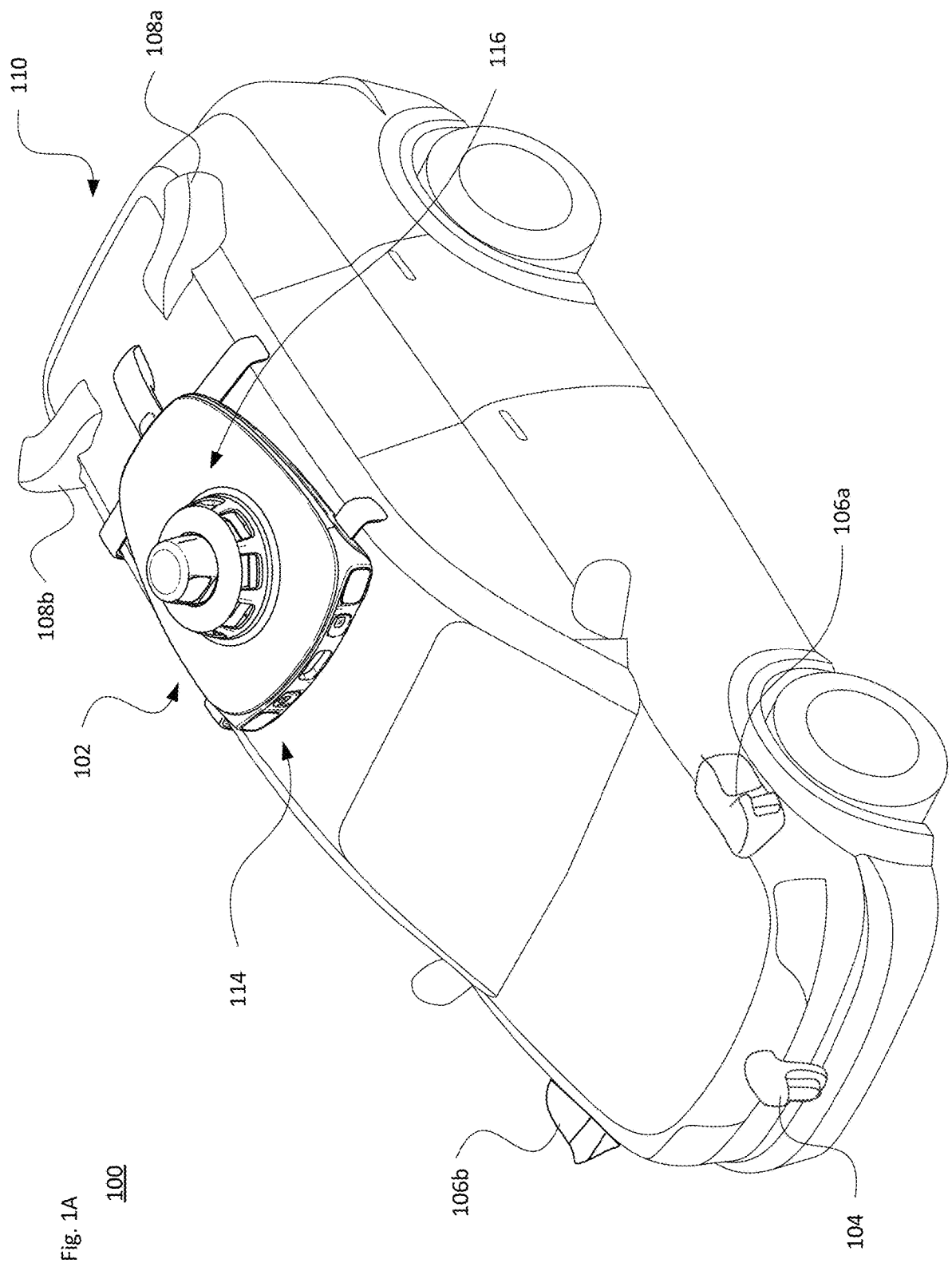
FIGS. 1A-B illustrate example self-driving vehicles in accordance with aspects of the technology.
Figure 1B:
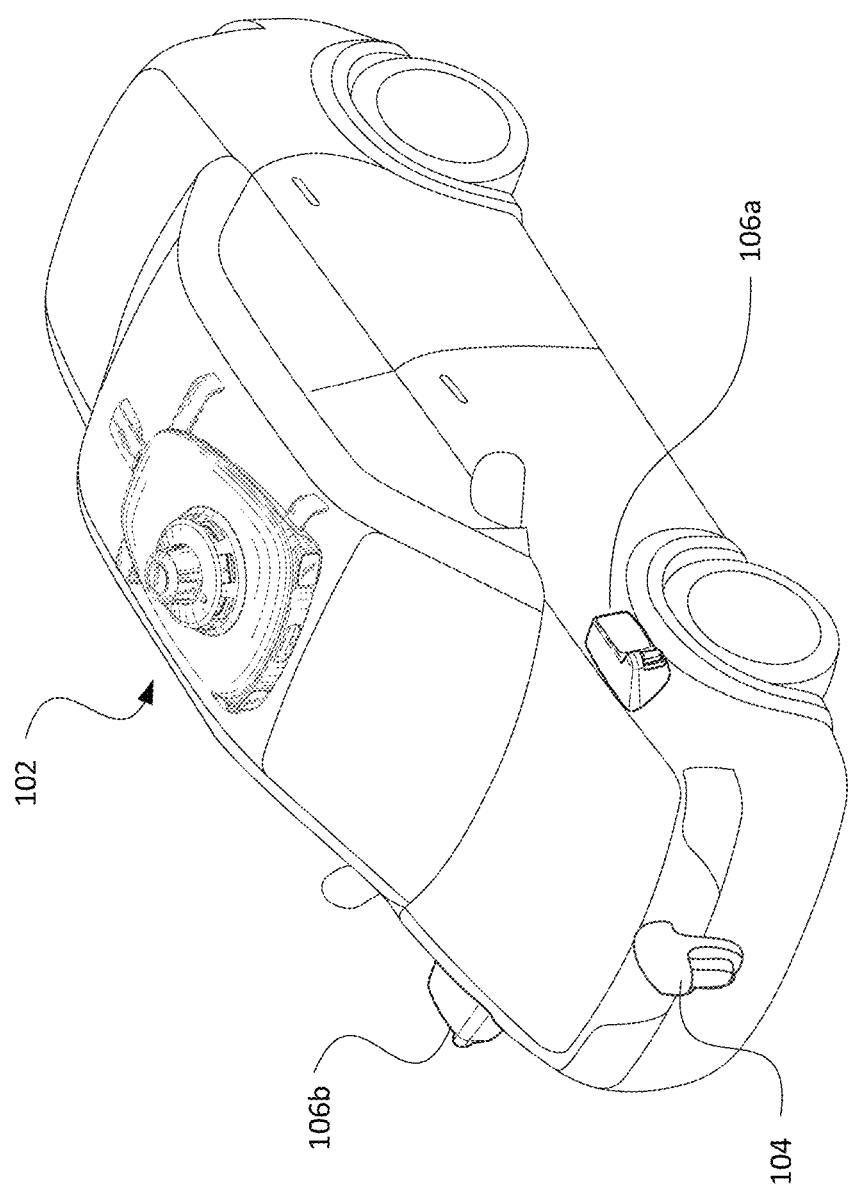

FIG. 1A illustrates a perspective view of an example passenger vehicle 100, such as a minivan or sport utility vehicle (SUV), configured to operate in a self-driving mode. FIG. 1B illustrates a perspective view of another example passenger vehicle 150 that is configured to operate in a partly self-driving mode, such as a sedan. These passenger vehicles may include various sensors for obtaining information about the vehicle's external environment. For instance, a roof-top housing unit (roof pod assembly) 102 may include a lidar sensor as well as various cameras (e.g., optical or infrared), radar units, acoustical sensors (e.g., microphone or sonar-type sensors), inertial (e.g., accelerometer, gyroscope, etc.) or other sensors (e.g., positioning sensors such as GPS sensors). Housing 104, located at the front end of vehicle 100, and housings 106a, 106b on the driver's and passenger's sides of the vehicle may each incorporate lidar, radar, camera and/or other sensors. For example, housing 106a may be located in front of the driver's side door along a quarter panel of the vehicle. As shown, the passenger vehicle 100 also includes housings 108a, 108b for radar units, lidar and/or cameras also located towards the rear roof portion of the vehicle. Additional lidar, radar units and/or cameras (not shown) may be located at other places along the vehicle 100. For instance, arrow 110 indicates that a sensor unit (not shown) may be positioned along the rear of the vehicle 100, such as on or adjacent to the bumper. Depending on the vehicle type and sensor housing configuration(s), acoustical sensors may be disposed in any or all of these housings around the vehicle.

Arrow 114 indicates that the roof pod 102 as shown includes a base section coupled to the roof of the vehicle. And arrow 116 indicated that the roof pod 102 also includes an upper section raised above the base section. Each of the base section and upper section may house different sensor units configured to obtain information about objects and conditions in the environment around the vehicle. The roof pod 102 and other sensor housings may also be disposed along vehicle 150 of FIG. 1B. By way of example, each sensor unit may include one or more sensors of the types described above, such as lidar, radar, camera (e.g., optical or infrared), acoustical (e.g., a passive microphone or active sound emitting sonar-type sensor), inertial (e.g., accelerometer, gyroscope, etc.) or other sensors (e.g., positioning sensors such as GPS sensors).

FIGS. 1C-D illustrate an example cargo vehicle 150, such as a tractor-trailer truck, that is configured to operate in a self-driving mode. The truck may include, e.g., a single, double or triple trailer, or may be another medium or heavy duty truck such as in commercial weight classes 4 through 8. As shown, the truck includes a tractor unit 152 and a single cargo unit or trailer 154. The trailer 154 may be fully enclosed, open such as a flat bed, or partially open depending on the type of cargo to be transported. In this example, the tractor unit 152 includes the engine and steering systems (not shown) and a cab 156 for a driver and any passengers.

The trailer 154 includes a hitching point, known as a kingpin, 158. The kingpin 158 is typically formed as a solid steel shaft, which is configured to pivotally attach to the tractor unit 152. In particular, the kingpin 158 attaches to a trailer coupling 160, known as a fifth-wheel, that is mounted rearward of the cab. For a double or triple tractor-trailer, the second and/or third trailers may have simple hitch connections to the leading trailer. Or, alternatively, each trailer may have its own kingpin. In this case, at least the first and second trailers could include a fifth-wheel type structure arranged to couple to the next trailer.

As shown, the tractor may have one or more sensor units 162, 164 disposed therealong. For instance, one or more sensor units 162 may be disposed on a roof or top portion of the cab 156, and one or more side sensor units 164 may be disposed on left and/or right sides of the cab 156. Sensor units may also be located along other regions of the cab 156, such as along the front bumper or hood area, in the rear of the cab, adjacent to the fifth-wheel, underneath the chassis, etc. The trailer 154 may also have one or more sensor units 166 disposed therealong, for instance along a side panel, front, rear, roof and/or undercarriage of the trailer 154.

As with the sensor units of the passenger vehicles of FIGS. 1A-B, each sensor unit of the cargo vehicle may include one or more sensors, such as lidar, radar, camera (e.g., optical or infrared), acoustical (e.g., microphone or sonar-type sensor), inertial (e.g., accelerometer, gyroscope, etc.) or other sensors (e.g., positioning sensors such as GPS sensors).

While certain aspects of the disclosure may be particularly useful in connection with specific types of vehicles, the vehicle may be different types of vehicle including, but not limited to, cars, motorcycles, cargo vehicles, buses, recreational vehicles, emergency vehicles, construction equipment, etc.

There are different degrees of autonomy that may occur for a vehicle operating in a partially or fully autonomous driving mode. The U.S. National Highway Traffic Safety Administration and the Society of Automotive Engineers have identified different levels to indicate how much, or how little, the vehicle controls the driving. For instance, Level 0 has no automation and the driver makes all driving-related decisions. The lowest semi-autonomous mode, Level 1, includes some drive assistance such as cruise control. At this level, the vehicle may operate in a strictly driver-information system without needing any automated control over the vehicle. Here, the vehicle's onboard sensors, relative positional knowledge between them, and a way for them to exchange data, can be employed to implement aspects of the technology as discussed herein. Level 2 has partial automation of certain driving operations, while Level 3 involves conditional automation that can enable a person in the driver's seat to take control as warranted. In contrast, Level 4 is a high automation level where the vehicle is able to drive without assistance in select conditions. And Level 5 is a fully autonomous mode in which the vehicle is able to drive without assistance in all situations. The architectures, components, systems and methods described herein can function in any of the semi or fully-autonomous modes, e.g., Levels 1-5, which are referred to herein as autonomous driving modes. Thus, reference to an autonomous driving mode includes both partial and full autonomy.

As discussed herein, aspects of the technology may be particularly applicable to autonomy levels 2 and 3, which can involve varying amounts of driver supervision. For instance, a test driver may be present in the vehicle as it operates autonomously, with the driver ready to take control. This can occur due to a vehicle-requested disengagement, or when the driver elects for manual control.

Figure 2:
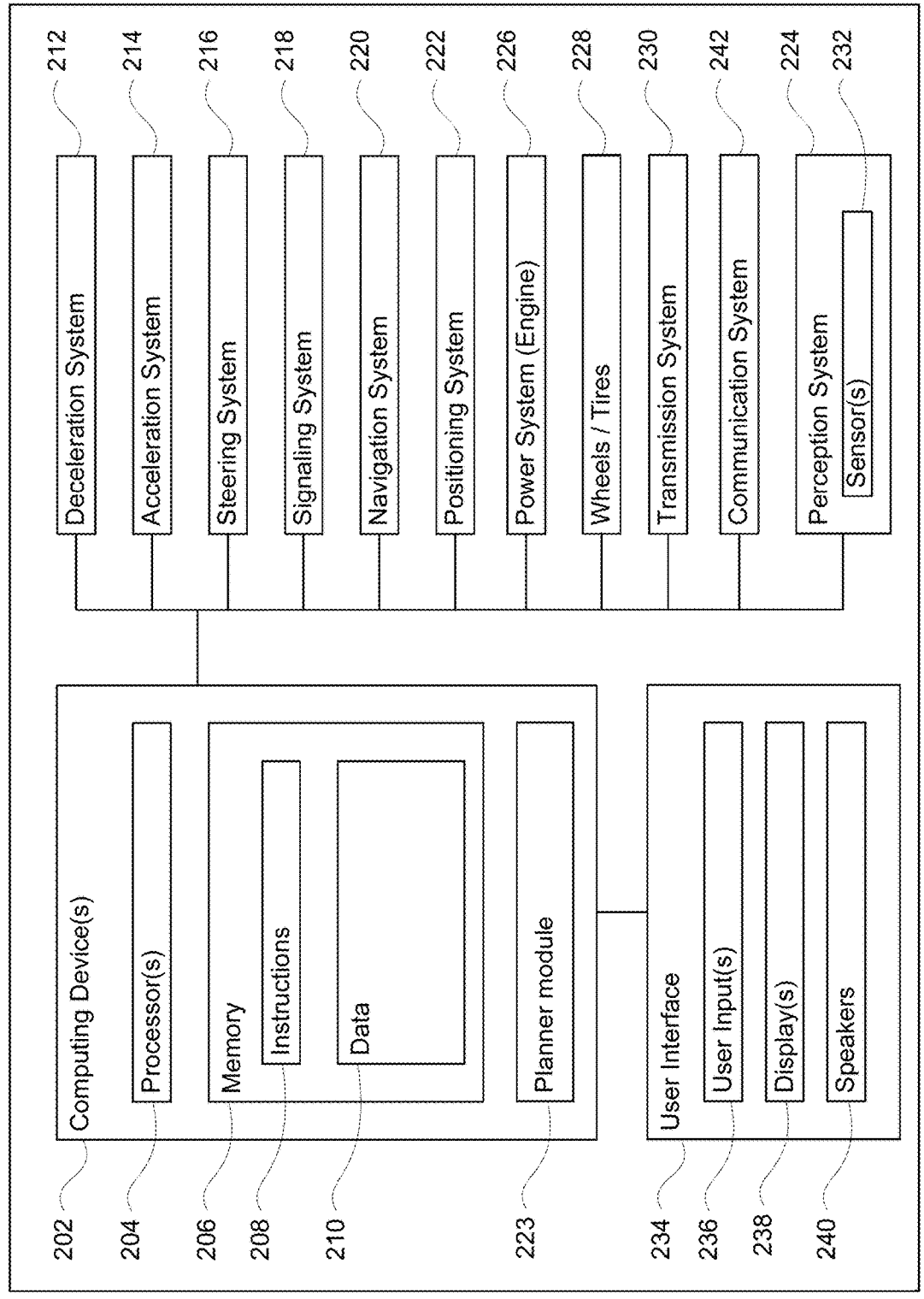
FIG. 2 illustrates components of a self-driving vehicle in accordance with aspects of the technology.

FIG. 2 illustrates a block diagram 200 with various components and systems of an exemplary vehicle, such as passenger vehicle 100 or 150, to operate in an autonomous driving mode. As shown, the block diagram 200 includes one or more computing devices 202, such as computing devices containing one or more processors 204, memory 206 and other components typically present in general purpose computing devices. The memory 206 stores information accessible by the one or more processors 204, including instructions 208 and data 210 that may be executed or otherwise used by the processor(s) 204. The computing system may control overall operation of the vehicle when operating in an autonomous driving mode.

The memory 206 stores information accessible by the processors 204, including instructions 208 and data 210 that may be executed or otherwise used by the processors 204. For instance, the memory may include a vehicle model, tables that compare maneuver steering rates to vehicle speeds, tables for speed-based perception discrepancies, lists of maneuver types, driver qualification information, object types, weather condition information, etc. The memory 206 may be of any type capable of storing information accessible by the processor, including a computing device-readable medium. The memory is a non-transitory medium such as a hard-drive, memory card, optical disk, solid-state, etc. Systems may include different combinations of the foregoing, whereby different portions of the instructions and data are stored on different types of media.

The instructions 208 may be any set of instructions to be executed directly (such as machine code) or indirectly (such as scripts) by the processor(s). For example, the instructions may be stored as computing device code on the computing device-readable medium. In that regard, the terms "instructions", "modules" and "programs" may be used interchangeably herein. The instructions may be stored in object code format for direct processing by the processor, or in any other computing device language including scripts or collections of independent source code modules that are interpreted on demand or compiled in advance. The data 210, such as lateral and/or longitudinal gap information, may be retrieved, stored or modified by one or more processors 204 in accordance with the instructions 208. In one example, some or all of the memory 206 may be an event data recorder or other secure data storage system configured to store vehicle diagnostics and/or detected sensor data, which may be on board the vehicle or remote, depending on the implementation.

The processors 204 may be any conventional processors, such as commercially available CPUs. Alternatively, each processor may be a dedicated device such as an ASIC or other hardware-based processor. Although FIG. 2 functionally illustrates the processors, memory, and other elements of computing devices 202 as being within the same block, such devices may actually include multiple processors, computing devices, or memories that may or may not be stored within the same physical housing. Similarly, the memory 206 may be a hard drive or other storage media located in a housing different from that of the processor(s) 204. Accordingly, references to a processor or computing device will be understood to include references to a collection of processors or computing devices or memories that may or may not operate in parallel.

In one example, the computing devices 202 may form an autonomous driving computing system incorporated into vehicle 100. The autonomous driving computing system may be capable of communicating with various components of the vehicle. For example, the computing devices 202 may be in communication with various systems of the vehicle, including a driving system including a deceleration system 212 (for controlling braking of the vehicle), acceleration system 214 (for controlling acceleration of the vehicle), steering system 216 (for controlling the orientation of the wheels and direction of the vehicle), signaling system 218 (for controlling turn signals), navigation system 220 (for navigating the vehicle to a location or around objects) and a positioning system 222 (for determining the position of the vehicle, which may include the vehicle's pose, e.g., position and orientation along the roadway or pitch, yaw and roll of the vehicle chassis relative to a coordinate system). The autonomous driving computing system may employ a planner module 223, in accordance with the navigation system 220, the positioning system 222 and/or other components of the system, e.g., for determining a route from a starting point to a destination or for planning a short term trajectory along an upcoming section of the roadway.

The computing devices 202 are also operatively coupled to a perception system 224 (for detecting objects in the vehicle's environment), a power system 226 (for example, a battery and/or gas or diesel powered engine) and a transmission system 230 in order to control the movement, speed, etc., of the vehicle in accordance with the instructions 208 of memory 206 in an autonomous driving mode which does not require or need continuous or periodic input from a passenger of the vehicle. Some or all of the wheels/tires 228 are coupled to the transmission system 230, and the computing devices 202 may be able to receive information about tire pressure, balance and other factors that may impact driving in an autonomous mode.

The computing devices 202 may control the direction and speed of the vehicle, e.g., via the planner module 223, by controlling various components. By way of example, computing devices 202 may navigate the vehicle to a particular location, such as a destination or intermediate stop or waypoint along a route, completely autonomously using data from the map information and navigation system 220. Computing devices 202 may use the positioning system 222 to determine the vehicle's location and the perception system 224 to detect and respond to objects when needed to reach the location safely. In order to do so, computing devices 202 may cause the vehicle to accelerate (e.g., by increasing fuel or other energy provided to the engine by acceleration system 214), decelerate (e.g., by decreasing the fuel supplied to the engine, changing gears, and/or by applying brakes by deceleration system 212), change direction (e.g., by turning the front and/or other wheels of vehicle 100 by steering system 216), and signal such changes (e.g., by lighting turn signals of signaling system 218). Thus, the acceleration system 214 and deceleration system 212 may be a part of a drivetrain or other type of transmission system 230 that includes various components between an engine of the vehicle and the wheels of the vehicle. Again, by controlling these systems, computing devices 202 may also control the transmission system 230 of the vehicle in order to maneuver the vehicle autonomously.

Navigation system 220 may be used by computing devices 202 in order to determine and follow a route to a location. In this regard, the navigation system 220 and/or memory 206 may store map information, e.g., highly detailed maps that computing devices 202 can use to navigate or control the vehicle. As an example, these maps may identify the shape and elevation of roadways (e.g., including road inclination/declination, banking or other curvature, etc.), lane markers, intersections, crosswalks, speed limits, traffic signal lights, buildings, signs, real time traffic information, vegetation, or other such objects and information. The lane markers may include features such as solid or broken double or single lane lines, solid or broken lane lines, reflectors, etc. A given lane may be associated with left and/or right lane lines or other lane markers that define the boundary of the lane. Thus, most lanes may be bounded by a left edge of one lane line and a right edge of another lane line.

The perception system 224 includes sensors 232 for detecting objects external to the vehicle. The detected objects may be other vehicles, obstacles in the roadway, traffic signals, signs, trees, etc. The sensors may 232 may also detect certain aspects of weather conditions, such as snow, rain or water spray, or puddles, ice or other materials on the roadway.

By way of example only, the sensors of the perception system may include light detection and ranging (lidar) sensors, radar units, cameras (e.g., optical imaging devices, with or without a neutral-density filter (ND) filter), positioning sensors (e.g., gyroscopes, accelerometers and/or other inertial components), infrared sensors, and/or any other detection devices that record data which may be processed by computing devices 202. The perception system 224 may also include one or more microphones or other acoustical arrays, for instance arranged along the roof pod 102 and/or other sensor assembly housings. The microphones may be capable of detecting sounds across a wide frequency band (e.g., 50 Hz-25 KHz) such as to detect various types of noises such as horn honks, tire squeals, brake actuation, etc.

Such sensors of the perception system 224 may detect objects outside of the vehicle and their characteristics such as location, orientation (pose) relative to the roadway, size, shape, type (for instance, vehicle, pedestrian, bicyclist, etc.), heading, speed of movement relative to the vehicle, etc., as well as environmental conditions around the vehicle. The perception system 224 may also include other sensors within the vehicle to detect objects and conditions within the vehicle, such as in the passenger compartment. For instance, such sensors may detect, e.g., one or more persons, pets, packages, etc., as well as conditions within and/or outside the vehicle such as temperature, humidity, etc. Information regarding the positioning of passengers, packages or other objects within the vehicle may help determine a center of gravity of the vehicle during a trip. Still further sensors 232 of the perception system 224 may measure the rate of rotation and/or pointing angle of the wheels 228, an amount or a type of braking by the deceleration system 212, and other factors associated with the equipment of the vehicle itself.

The raw data obtained by the sensors can be processed by the perception system 224 and/or sent for further processing to the computing devices 202 periodically or continuously as the data is generated by the perception system 224. Computing devices 202 may use the positioning system 222 to determine the vehicle's location and perception system 224 to detect and respond to objects when needed to reach the location safely, e.g., via adjustments made by planner module 223, including adjustments in operation to deal with occlusions, slippery road surfaces, potential perception errors and other issues. In addition, the computing devices 202 may perform validation or calibration of individual sensors, all sensors in a particular sensor assembly, or between sensors in different sensor assemblies or other physical housings.

As illustrated in FIGS. 1A-B, certain sensors of the perception system 224 may be incorporated into one or more sensor assemblies or housings. In one example, these may be integrated into front, rear or side perimeter sensor assemblies around the vehicle. In another example, other sensors may be part of the roof-top housing (roof pod) 102. The computing devices 202 may communicate with the sensor assemblies located on or otherwise distributed along the vehicle. Each assembly may have one or more types of sensors such as those described above.

Returning to FIG. 2, computing devices 202 may include all of the components normally used in connection with a computing device such as the processor and memory described above as well as a user interface subsystem 234. The user interface subsystem 234 may include one or more user inputs 236 (e.g., a mouse, keyboard, touch screen and/or microphone) and one or more display devices 238 (e.g., a monitor having a screen or any other electrical device that is operable to display information). In this regard, an internal electronic display may be located within a cabin of the vehicle (not shown) and may be used by computing devices 202 to provide information to a driver and passengers within the vehicle. Other output devices, such as speaker(s) 240 may also be located within the passenger vehicle. The user interface 234 may also be configured to provide haptic feedback to a driver, e.g., via vibration of the steering wheel, driver's seat, armrest, etc.

The vehicle may also include a communication system 242. For instance, the communication system 242 may also include one or more wireless configurations to facilitate communication with other computing devices, such as passenger computing devices within the vehicle, computing devices external to the vehicle such as in other nearby vehicles on the roadway, and/or a remote server system. The network connections may include short range communication protocols such as Bluetooth™, Bluetooth™ low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

Figure 3A:
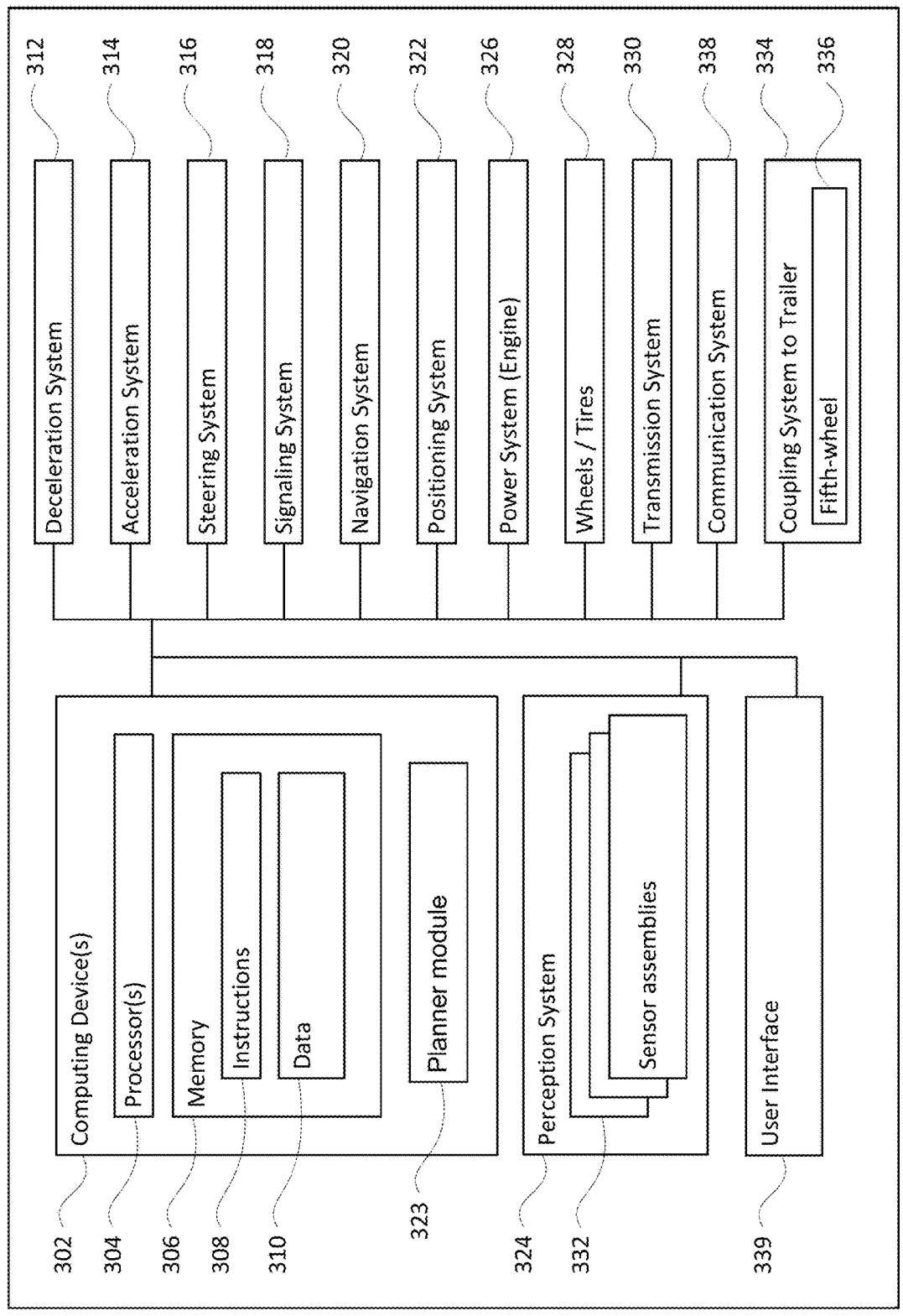
FIGS. 3A-B are block diagrams of systems of an example cargo-type vehicle in accordance with aspects of the technology.

FIG. 3A illustrates a block diagram 300 with various components and systems of a vehicle configured for autonomous driving, e.g., vehicle 150 of FIGS. 1C-D. By way of example, the vehicle may be a truck, farm equipment or construction equipment, configured to operate in one or more autonomous modes of operation. As shown in the block diagram 300, the vehicle includes a control system of one or more computing devices, such as computing devices 302 containing one or more processors 304, memory 306 and other components similar or equivalent to components 202, 204 and 206 discussed above with regard to FIG. 2.

The control system may constitute an electronic control unit (ECU) of a tractor unit of a cargo vehicle. As with instructions 208, the instructions 308 may be any set of instructions to be executed directly (such as machine code) or indirectly (such as scripts) by the processor. Similarly, the data 310 may be retrieved, stored or modified by one or more processors 304 in accordance with the instructions 308.

In one example, the computing devices 302 may form an autonomous driving computing system incorporated into vehicle 150. Similar to the arrangement discussed above regarding FIG. 2, the autonomous driving computing system of block diagram 300 may be capable of communicating with various components of the vehicle in order to perform route planning and driving operations. For example, the computing devices 302 may be in communication with various systems of the vehicle, such as a driving system including a deceleration system 312, acceleration system 314, steering system 316, signaling system 318, navigation system 320 and a positioning system 322, each of which may function as discussed above regarding FIG. 2.

The computing devices 302 are also operatively coupled to a perception system 324, a power system 326 and a transmission system 330. Some or all of the wheels/tires 228 are coupled to the transmission system 230, and the computing devices 202 may be able to receive information about tire pressure, balance, rotation rate, wheel angle, wear, and other factors that may impact driving in an autonomous mode. As with computing devices 202, the computing devices 302 may control the direction and speed of the vehicle by controlling various components. By way of example, computing devices 302 may navigate the vehicle to a destination location completely autonomously using data from the map information and navigation system 320. Computing devices 302 may employ a planner module 323, in conjunction with the positioning system 322, the perception system 324 and other subsystems to detect and respond to objects when needed to reach the location safely, similar to the manner described above for planner module 223 FIG. 2.

Similar to perception system 224, the perception system 324 also includes one or more sensors or other components such as those described above for detecting objects external to the vehicle, objects or conditions internal to the vehicle, and/or operation of certain vehicle equipment such as the wheels 328, deceleration system 312, acceleration system 314, steering system 316, transmission system 330, etc. For instance, as indicated in FIG. 3A the perception system 324 includes one or more sensor assemblies 332. Each sensor assembly 232 includes one or more sensors. In one example, the sensor assemblies 332 may be arranged as sensor towers integrated into the side-view mirrors on the truck, farm equipment, construction equipment or the like. Sensor assemblies 332 may also be positioned at different locations on the tractor unit 152 or on the trailer 154, as noted above with regard to FIGS. 1C-D. The computing devices 302 may communicate with the sensor assemblies located on both the tractor unit 152 and the trailer 154. Each assembly may have one or more types of sensors such as those described above.

Also shown in FIG. 3A is a coupling system 334 for connectivity between the tractor unit and the trailer. The coupling system 334 may include one or more power and/or pneumatic connections (not shown), and a fifth-wheel 336 at the tractor unit for connection to the kingpin at the trailer. A communication system 338, equivalent to communication system 242, is also shown as part of vehicle system 300.

Similar to FIG. 2, in this example the cargo truck or other vehicle may also include a user interface subsystem 339. The user interface subsystem 339 may be located within the cabin of the vehicle and may be used by computing devices 202 to provide information to a driver and passengers within the vehicle, such as a truck driver who is capable of driving the truck in a manual driving mode.

Figure 3B:
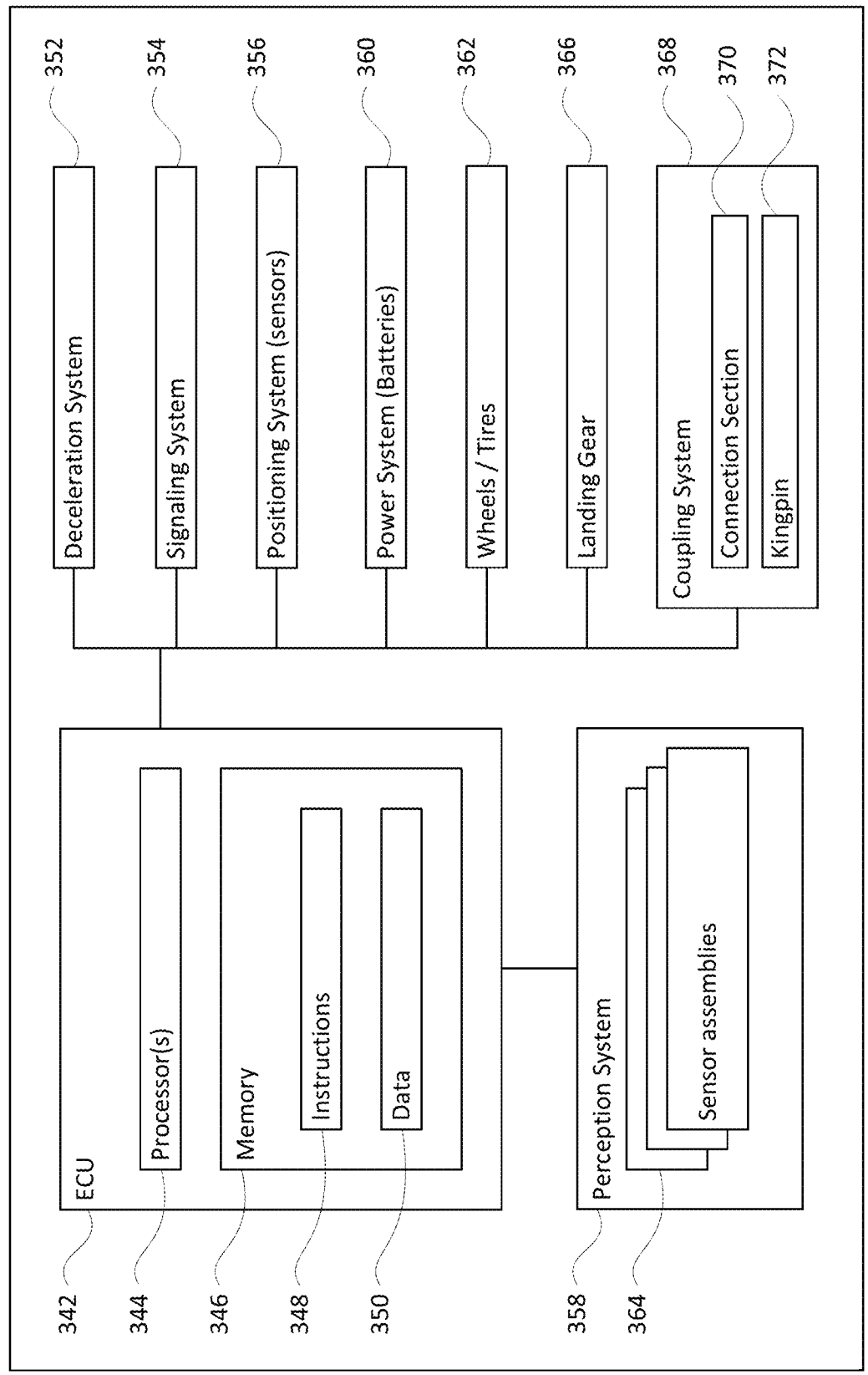

FIG. 3B illustrates an example block diagram 340 of systems of the trailer, such as trailer 154 of FIGS. 1C-D. As shown, the system includes an ECU 342 of one or more computing devices, such as computing devices containing one or more processors 344, memory 346 and other components typically present in general purpose computing devices. The memory 346 stores information accessible by the one or more processors 344, including instructions 348 and data 350 that may be executed or otherwise used by the processor(s) 344. The descriptions of the processors, memory, instructions and data from FIGS. 2 and 3A apply to these elements of FIG. 3B.

The ECU 342 is configured to receive information and control signals from the trailer unit. The on-board processors 344 of the ECU 342 may communicate with various systems of the trailer, including a deceleration system 352, signaling system 354, and a positioning system 356. The ECU 342 may also be operatively coupled to a perception system 358 with one or more sensors arranged in sensor assemblies 364 for detecting objects in the trailer's environment. The ECU 342 may also be operatively coupled with a power system 360 (for example, a battery power supply) to provide power to local components. Some or all of the wheels/tires 362 of the trailer may be coupled to the deceleration system 352, and the processors 344 may be able to receive information about tire pressure, balance, rotation rate, wheel angle, wear, and other factors that may impact driving in an autonomous mode, and to relay that information to the processing system of the tractor unit. The deceleration system 352, signaling system 354, positioning system 356, perception system 358, power system 360 and wheels/tires 362 may operate in a manner such as described above with regard to FIGS. 2 and 3A.

The trailer also includes a set of landing gear 366, as well as a coupling system 368. The landing gear may provide a support structure for the trailer when decoupled from the tractor unit. The coupling system 368, which may be a part of coupling system 334, provides connectivity between the trailer and the tractor unit. Thus, the coupling system 368 may include a connection section 370 (e.g., for communication, power and/or pneumatic links to the tractor unit). The coupling system also includes a kingpin 372 configured for connectivity with the fifth-wheel of the tractor unit.

EXAMPLES

Aspects of the technology provide an approach to determine a minimum lateral gap or other positional gap between a vehicle and objects in the environment, which can be particularly beneficial for test drivers in vehicles operating in dense urban environments. A method for budgeting the minimum (lateral) gap can be used to protect against potential collisions due to (lateral) position errors. This can include cross-track errors and discrepancies with information obtained by the vehicle's perception system. In the autonomous vehicle context, cross-track error (CTE) can be defined as the difference (Δ) in lateral position between the desired vehicle path and its actual path. Perception errors may be considered as discrepancies between the perceived location of an object and the actual location of the object. Another possible consideration is uncertainty from the vehicle's behavior prediction system, which can estimate the short-term behavior of nearby objects, in particular other road users such as cars, trucks, motorcyclists, bicyclists, pedestrians crossing the street, etc. Behavior prediction uncertainty may be beneficial because such predictions are actually a distribution, and naturally have some uncertainty in the exact position in the future, which could be considered when computing minimum lateral gap or another positional gap.

In one scenario, a budgeted planned lateral gap (clearance) is determined so that the driver is able to stay within it as the driver takes over control of the vehicle. Determining the clearance includes calculating a budgeted lateral gap for a least restrictive gap. As noted above, this can be done for a set of possible speed and steering rate limit combinations, and is based on the sum of distances associated with potential perception and cross-track errors, as well as a buffer for recovery.

Figure 4:
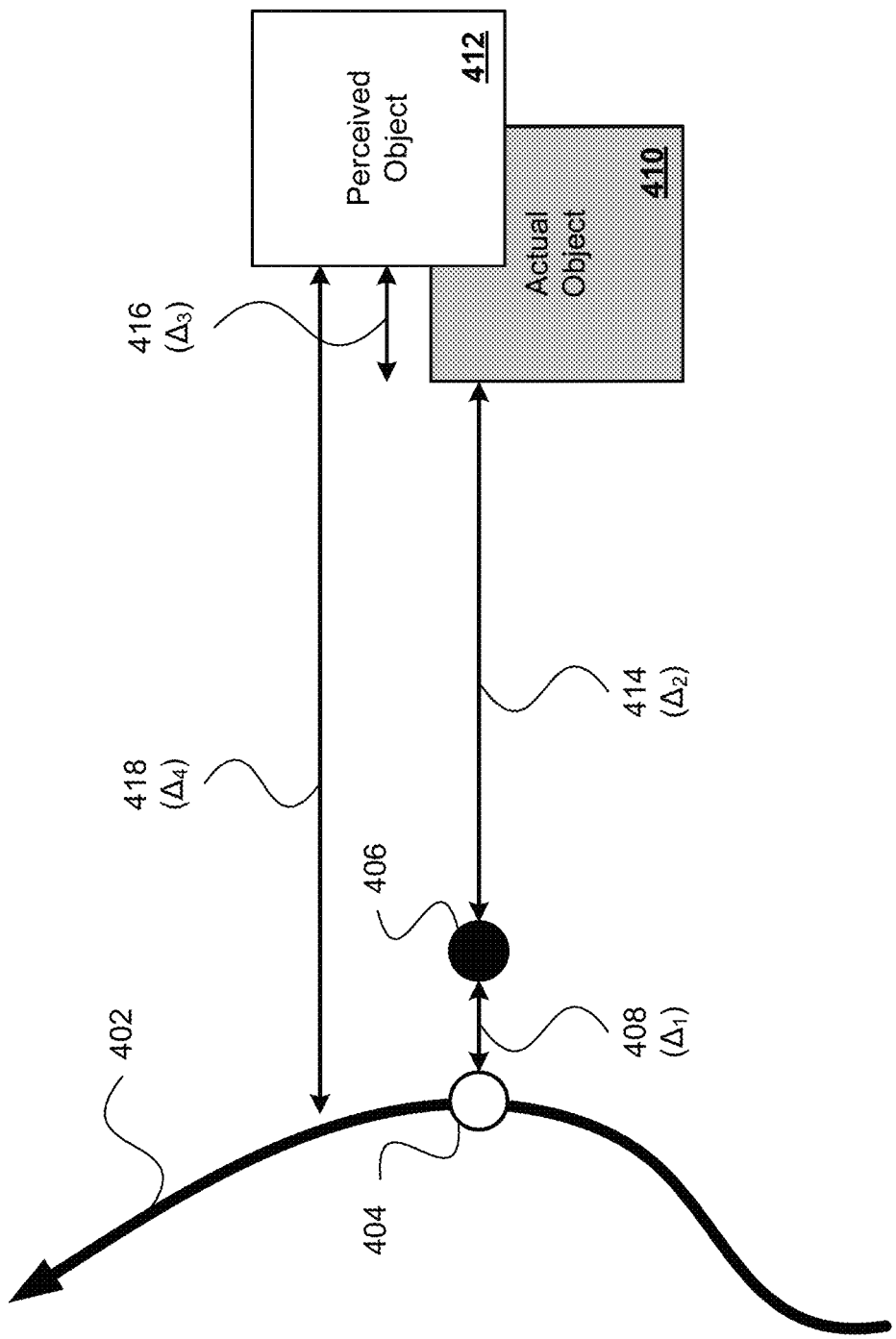
FIG. 4 illustrates an example of budgeting for a planned lateral gap in accordance with aspects of the technology.

FIG. 4 illustrates an example 400 that shows how the planned lateral gap may be budgeted based on various factors. Line 402 indicates a planned trajectory of the vehicle along a roadway, which may be created by the planner module 223 or 323 discussed above. Circle 404 is the planned position for the vehicle along the trajectory. Circle 406 represents the actual position of the vehicle. For instance, position 406 may be determined by GPS measurements, localization based on map data and imagery taken by the vehicle's sensors. It may also be based on sensors such as an accelerometer, gyroscope and/or other sensors to determine speed, acceleration and heading. Arrow 408 represents the lateral discrepancy ($\Delta_1$) between planned position 404 and position 406. The lateral discrepancy associated with arrow 408 is for a cross-track error. According to one scenario, this lateral discrepancy is associated with a predetermined CTE percentile, e.g., 95% or 99%, which may be based on analytical estimation of CTE using simulation models of the vehicle and a path tracking controller in a specific environment in conjunction with historical performance data, which would help characterize the statistical distribution of non modelled events, such as disturbances for one or more vehicles of a fleet of vehicles of a given type. Thus, in one example, the minimum lateral gap=CTE at 99th percentile+perception error at 99th percentile+a recovery buffer.

Block 410 indicates the location of an actual object in the environment near the vehicle, and block 412 indicates the location of a perceived object in the environment. Arrow 414 between circle 406 and the actual object 410 is the allowed actual gap to the object ($\Delta_2$). By way of example, this gap $\Delta_2$ may be the maximum lateral deviation permitted while providing for the driver to take over at a particular speed (e.g., during a recovery maneuver). For instance, the vehicle's control system may limit the steering rate (e.g., radians/second) when operating autonomously so that the driver can overcome any issues, within the allowed actual gap. The example 400 may represent a scenario where the vehicle (in autonomous mode) swerves with a steering rate within its limits, and the driver subsequently takes over control of the vehicle after some assumed reaction time from the onset of the swerve and returns the vehicle to its original pre-swerve trajectory with some assumed steering rate (where the reaction time and driver steering rate are the takeover characteristics). The vehicle may be assumed to be traveling straight initially. The gap would then be the largest lateral deviation of the vehicle from its original trajectory throughout the scenario. This would be a simple model of driver response to a swerve. Future simulation/models could include more complex driver behavior (e.g., braking while turning). By way of example, the deviation may be due to an AI-induced swerve due to misclassifying an object (e.g., a neural network initially perceiving a plant as a road user).

Arrow 416 indicates a perception error between the actual object and the perceived object ($\Delta_3$). The perception error may be due to sensor discrepancies corresponding to the speed of the vehicle, or the speed of the vehicle relative to the movement of the object. The perception system may publish this perception error signal itself, as it would depend on the type of sensors used to detect the object and other aspects of the scene, such as fog, rain, sleet, etc. The perception error could also come from just the granularity of the sensor itself, such as based on how many (or few) data points are obtained in lidar point cloud information. In one example, this could cause the position to be off by 2-5 cm just due to data point granularity. Furthermore, different types of sensors may have different perception errors at a given speed (e.g., lidar v. radar v. optical camera).

Based on this information, a required minimum planned lateral gap ($\Delta_4$) as indicated by arrow 418 is calculated. In one example, $\Delta_4=\Delta_1+\Delta_2+\Delta_3$. In another example, information from a vehicle model may be factored into the analysis. For instance, some overlap for the gaps may be permitted due to the vehicle's mirrors (e.g., a 2-5% overlap or a 0.2 m-0.8 m mirror overlap), for instance because the mirrors extend away from the vehicle body (e.g., a mirror configuration). The calculation for the planned lateral gap may be done for a set of possible speed and steering rate limit combinations, e.g., using swerve statistical information from simulation and/or historical events. Alternatively, one or more tables may be stored in memory with sets of speed and steering rate limits. From this set of data, the required planned lateral gap is selected, for instance to obtain the smallest value (distance) to enable collision avoidance with the object.

According to one aspect of the technology, for various steering limits, the system is able to determine a minimum safe lateral gap so that a driver can stay in control during a disengagement or otherwise when taking over control of the vehicle. An example situation is provided below. In this example, the system determines that the $\Delta_1$ discrepancy at the $99^{th}$ percentile is 0.065 m. Based on the 3D model for this particular vehicle (e.g., vehicle 100 of FIG. 1A), there may be a mirror contour overlap of, for instance, 0.025 m-0.1 m. Table 1 below shows examples of a lateral deviation $\Delta_2$ based on the vehicle speed at the time of maneuver is evaluated across a range of maneuver steering rates (rad/s) and vehicle speeds (mph), for instance assuming a steering step command (that would be unrealistic) with maximum allowable steering rate. Such steering step events would only happen in case of a catastrophic perception/planning failure that would not be a representative behavior of L2 to L4 system. According to one aspect, an appropriate determination of the maximum lateral deviation would be primarily driven by swerves induced by potential misperception or misclassification of objects. The data in Table 1 is presented as simple examples of what could be physically possible from the vehicle plus driver to make the further definition of the concept easier.

TABLE 1

Maximum deviation during recover from maneuver (m) with a step steering command

| | 2 mph | 5 mph | 10 mph | 15 mph |
|---|---|---|---|---|
| 0.215 rad/s | 0.02 | 0.05 | 0.13 | 0.19 |
| 0.322 rad/s | 0.03 | 0.09 | 0.23 | 0.35 |
| 0.387 rad/s | 0.04 | 0.12 | 0.31 | 0.47 |
| 0.430 rad/s | 0.05 | 0.14 | 0.36 | 0.57 |

As noted above, the perception discrepancy, $\Delta_3$, can be partly a function of vehicle speed. An example comparing vehicle speed (mph) to discrepancy (error in meters) is shown in Table 2 below:

TABLE 2

Speed-based perception discrepancy

| Speed (mph) | 2 | 5 | 10 | 15 | 20 | 25 | 35 | 45 |
|---|---|---|---|---|---|---|---|---|
| Error (m) | 0.005 | 0.005 | 0.010 | 0.015 | 0.020 | 0.025 | 0.036 | 0.046 |

Based on this information, a set of values for the planned minimum lateral gap $\Delta_4$ are derived, as shown in Table 3 below:

TABLE 3

Minimum planned lateral gap (m)

| | 2 mph | 5 mph | 10 mph | 15 mph |
|---|---|---|---|---|
| 0.215 rad/s | 0.04 | 0.07 | 0.15 | 0.22 |
| 0.322 rad/s | 0.05 | 0.11 | 0.25 | 0.38 |
| 0.387 rad/s | 0.06 | 0.14 | 0.33 | 0.50 |
| 0.430 rad/s | 0.07 | 0.16 | 0.39 | 0.60 |

The values in the table's columns are minimum distances in meters. Note that the minimum distances equal deviation during each maneuver, and do not include any additional safety buffer. How the vehicle uses this information when informing the driver to take control may depend on various factors, including the type of object (e.g., static object, parked car, pedestrian, bicyclist, moving vehicle, etc.) and/or type of maneuver (e.g., lateral course correction, braking, acceleration, etc.). For instance, the minimum planned lateral gap for a static object (e.g., highway divider, traffic cone, etc.) may be smaller than the minimum planned lateral gap for a moving vehicle (e.g., a sedan, truck, construction vehicle, emergency vehicle, etc.).

FIGS. 5A-D are examples that highlight the values in Table 3 for different types of objects. In particular, FIG. 5A shows a set of highlighted values for a static object scenario, FIG. 5B shows another set of highlighted values for a parked car scenario, FIG. 5C shows a further set of highlighted values for a scenario where the object is a pedestrian or bicyclist, and FIG. 5D shows yet another set of highlighted values for a moving object scenario.

It can be seen that at slower speeds and lower steering rates, the minimum planned lateral gap between the vehicle and the object can be quite small, e.g., less than 10 cm at a speed on the order of 2 mph. However, depending on the driving maneuver, vehicle speed and the type of object, larger gaps may be necessary. These examples also show a benefit in being able to accurately detect the type of object, which may be done, e.g., directly by the perception system, by the on-board computing system, or both.

As noted above, information that can impact the analysis may be stored on-board the vehicle in memory (e.g., in memory 206 of FIG. 2 or memory 306 of FIG. 3A). Such information may be associated with the vehicle model, tables that compare maneuver steering rates to vehicle speeds, tables for speed-based perception discrepancies, lists of maneuver types (e.g., lateral position correction, braking, acceleration, etc.), driver qualification information (experience, familiarity with vehicle, driver reaction time, etc.), object types, temporal and weather condition information, etc. For instance, while the average driver reaction time may be on the order of 0.25 seconds when taking over in response to a disengagement, this time may be higher (or lower) depending on how familiar the driver is with the particular vehicle, whether it is late at night or early in the day, whether the road is slick from precipitation, whether visibility is poor due to snow or fog, etc. Thus, it can be seen that the minimum lateral gap can be determined by the planner module to parameterize the required gap for safe disengagements, as a function of maneuver steering rate and vehicle speed, as well as other factors.

The following is an example of a possible worst-case steering disturbance situation in which the nearby object is a bicycle, evaluating the largest CTE and yaw errors over the course of a maneuver for a range of speeds from 2 mph to 15 mph.

Figure 6A:
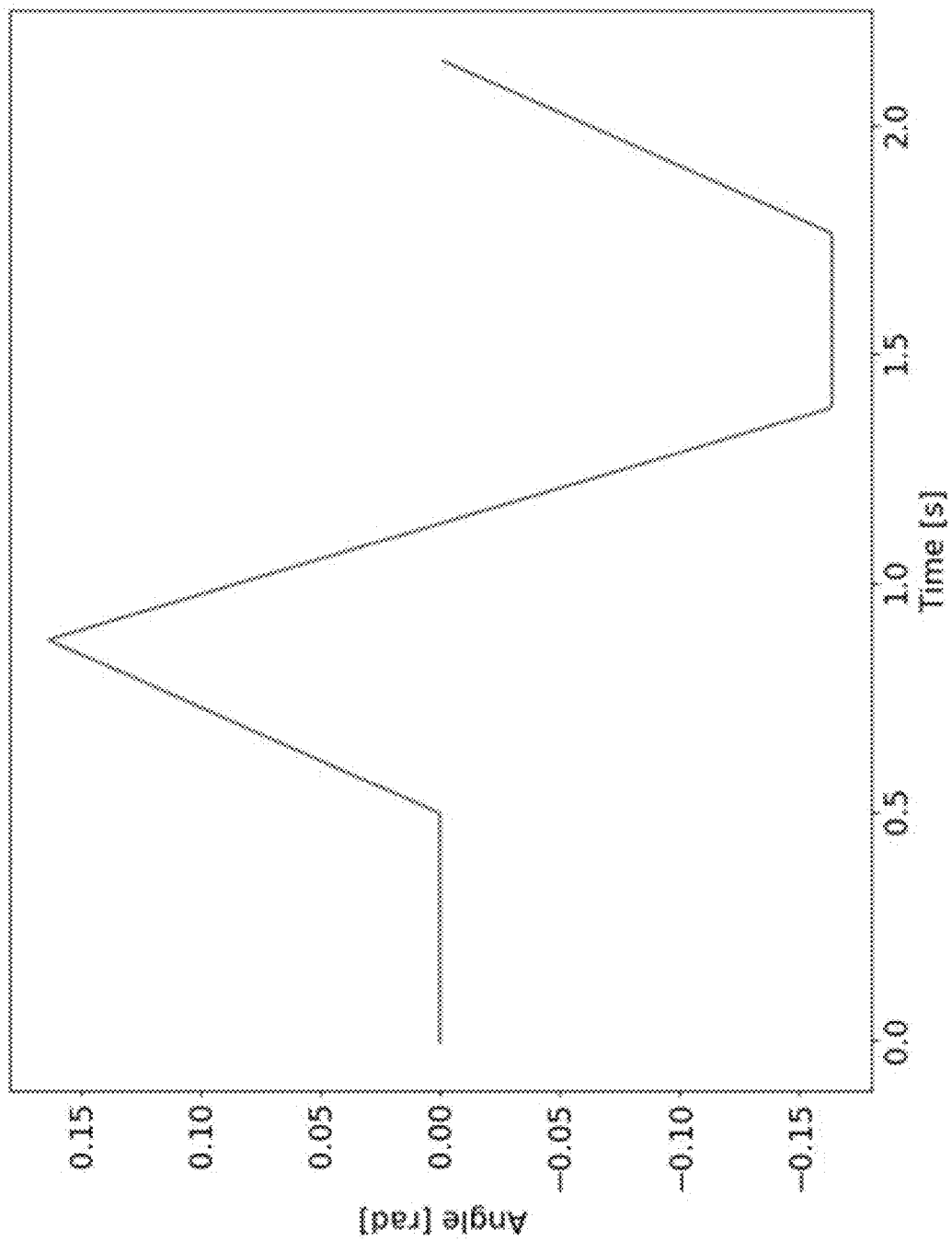
FIGS. 6A-C illustrate example charts regarding a steering disturbance situation in accordance with aspects of the technology.
Figure 6B:
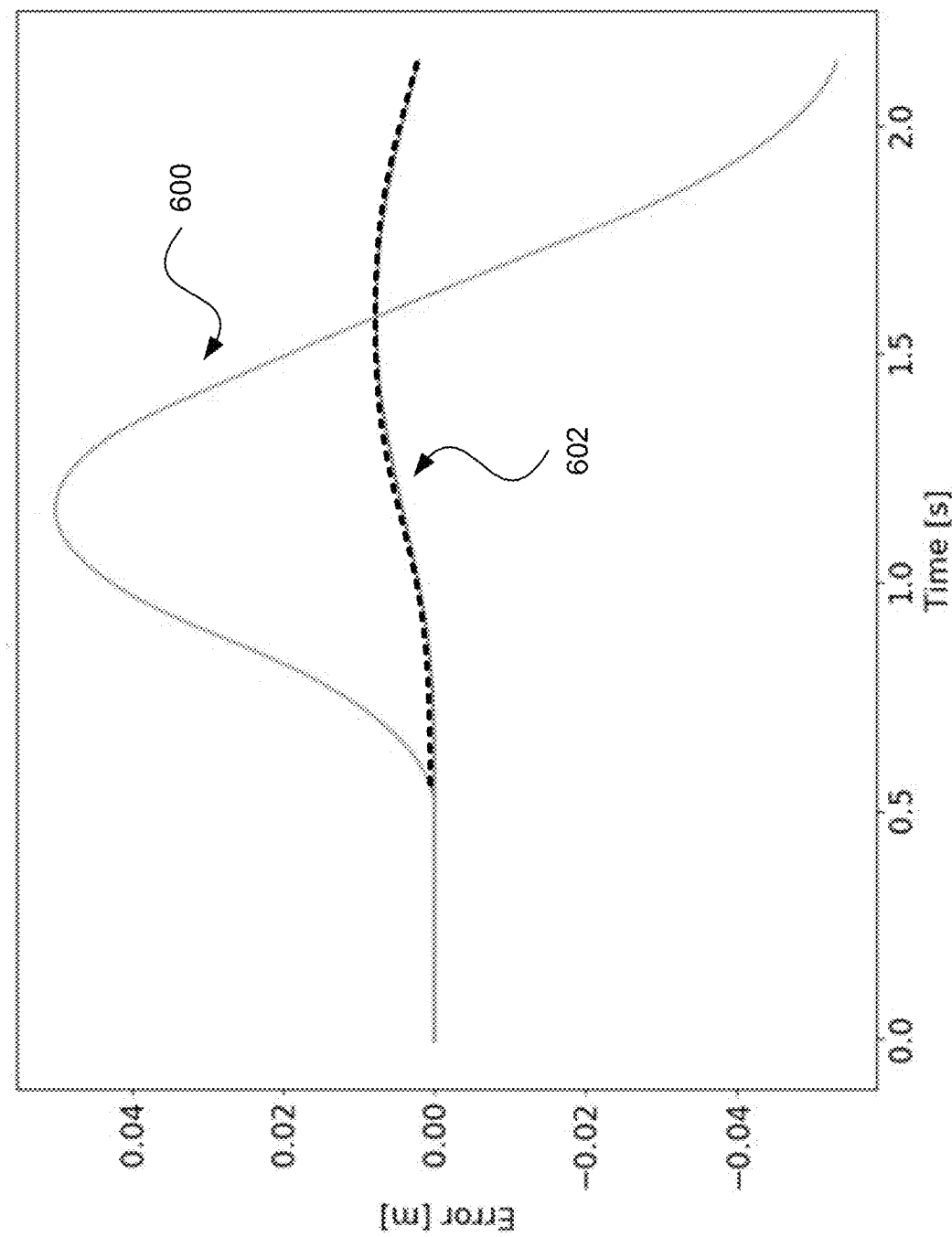
Figure 6C:
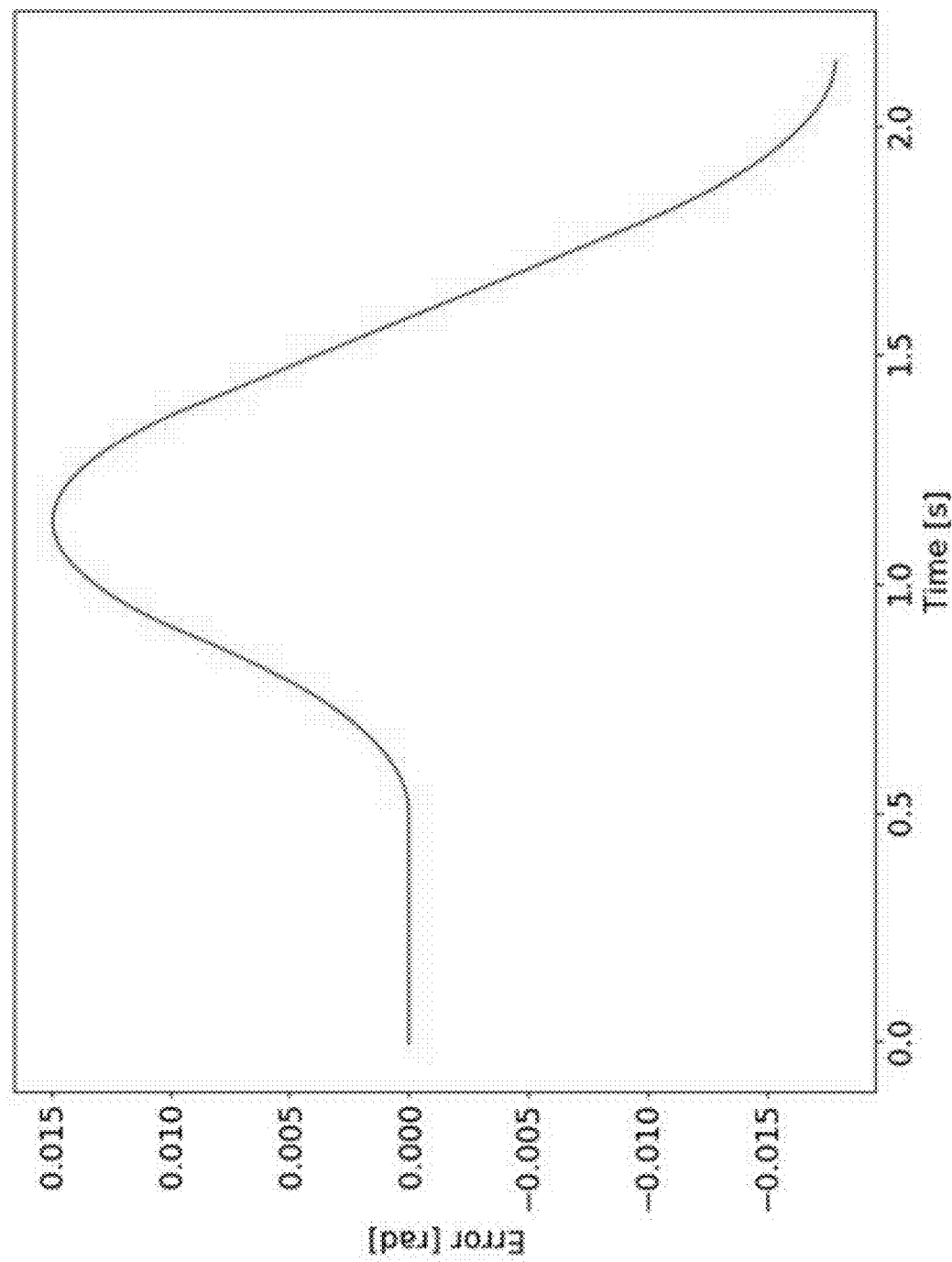

FIG. 6A plots an example of the tire angle in radians over time, at a speed of 2 mph and at a steering step maneuver with a steering rate limit of 0.430 rad/s; hence the tire angle is being rate limited and looks like a ramp. FIG. 6B plots front and rear axle CTE for the same maneuver as in FIG. 6A. Here, the solid line 600 represents the front axle CTE, and the dotted line 602 represents the rear axle CTE. And FIG. 6C plots yaw error as a function of time for the same maneuver as in FIG. 6A.

In accordance with this example, a set of values can be determined for the maximum front axle CTE (m) across a range of speeds and maneuver steering rate limits, as shown in Table 4.

TABLE 4

Front Axle CTE (m) as a function of speed
(mph) and maneuver steering rate limits (rad/s)

| | 2 mph | 5 mph | 10 mph | 15 mph |
|---|---|---|---|---|
| 0.215 | 0.020 | 0.052 | 0.126 | 0.186 |
| 0.322 | 0.033 | 0.090 | 0.229 | 0.348 |
| 0.387 | 0.043 | 0.118 | 0.306 | 0.471 |
| 0.430 | 0.050 | 0.138 | 0.363 | 0.565 |

Similarly, a set of values can be determined for the rear axle CTE (m) across the same range of speeds and maneuver steering rate limits, as shown in Table 5.

TABLE 5

Rear Axle CTE (m) as a function of speed (mph)
and maneuver steering rate limits (rad/s)

| | 2 mph | 5 mph | 10 mph | 15 mph |
|---|---|---|---|---|
| 0.215 | 0.002 | 0.013 | 0.060 | 0.113 |
| 0.322 | 0.004 | 0.027 | 0.123 | 0.232 |
| 0.387 | 0.006 | 0.038 | 0.175 | 0.329 |
| 0.430 | 0.008 | 0.047 | 0.215 | 0.405 |

In addition, a set of values can be determined for yaw error (rad) across the range of speeds and maneuver steering rate limits, as shown in Table 6.

TABLE 6

Yaw Error (rad) as a function of speed (mph) and
maneuver steering rate limits (rad/s)

| | 2 mph | 5 mph | 10 mph | 15 mph |
|---|---|---|---|---|
| 0.215 | 0.006 | 0.015 | 0.031 | 0.041 |
| 0.322 | 0.010 | 0.025 | 0.052 | 0.070 |
| 0.387 | 0.013 | 0.032 | 0.067 | 0.090 |
| 0.430 | 0.015 | 0.037 | 0.077 | 0.104 |

According to another aspect, control limits for operating the vehicle can consider the lateral gap and vehicle speed in view of constraints such as steering rate limit and lateral jerk limit. Jerk can be considered as a change in the rate of acceleration with respect to time (e.g., $m/s^3$). The lateral jerk limits can be converted to a speed-dependent steering rate limit (see discussion below), and then a lateral deviation can be calculated the same way that it is calculated from a steering rate limit. In one example, the system may curve fit to parameterize the required minimum lateral gap for a safe disengagement as a function of maneuver steering rate and vehicle speed, for instance according to the equation $z=Ax+By+Cxy$, where x=vehicle speed (m/s), y=steering rate (rad/s), and A, B and C are selected to minimize the sum of squared errors. Based on this, a grid or table can be created comparing vehicle speed to maneuver steering rate. The steering rate limit may be determined, in part, based on the wheelbase of the vehicle, the vehicle speed and the lateral jerk. For instance, in one scenario steering jerk limit may be computed as follows. From a desired lateral jerk limit and known vehicle properties (e.g., wheelbase, understeer gradient, etc.), the equivalent steering rate limit can be calculated that would enforce the lateral jerk limit at a given vehicle speed and assuming that there is no longitudinal acceleration. This calculation may be performed by the system across the range of possible speeds and lateral jerk limits, with takeover simulated to come up with the minimum required takeover buffers in each case. Then the perception error/CTE buffers may be added to obtain the minimum planned lateral gaps for each case (per speed, lateral jerk limit). This information can then be captured in a 2D lookup table, or could be approximated with a curve/function.

Figure 7:
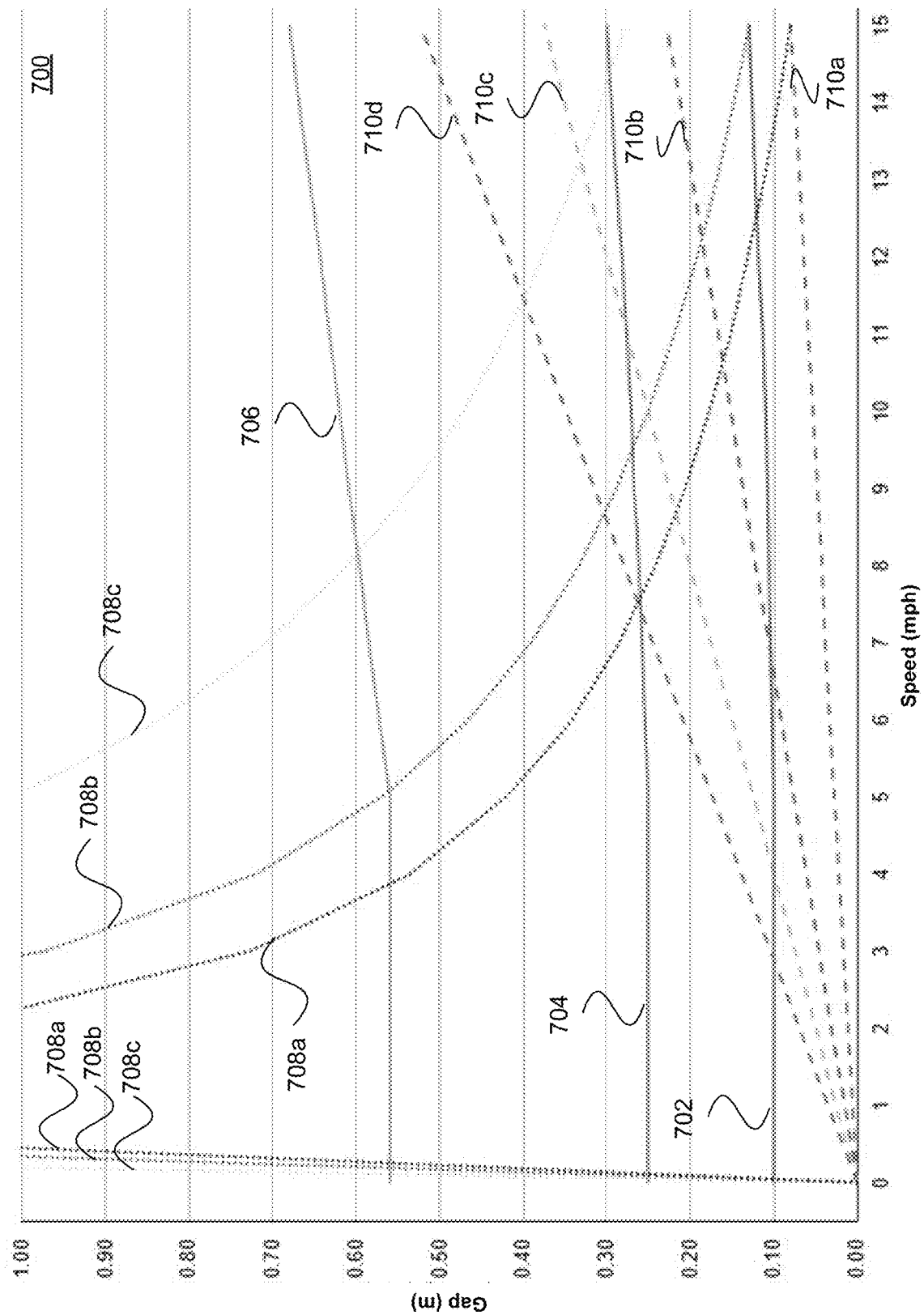
FIG. 7 illustrates example implementation chart for lateral gap and vehicle speed in view of selected constraints in accordance with aspects of the technology.

In view of this, FIG. 7 illustrates an example chart 700 for three different scenarios involving a static object, a parked car, and a pedestrian or bicyclist. Each chart plots a required minimum gap (m) across a range of speeds (mph), while also showing different lateral jerk rates ($m/s^3$) and steering rate limits (rad/s). In particular, the figure illustrates a minimum gap 702 for a static object example, a minimum gap 704 for a parked car example, and a minimum gap 706 for a pedestrian or bicyclist. As shown, curves for three lateral jerk rates are presented, in particular a first rate 708a of 1.5 $m/s^3$, a second rate 708b of 2 $m/s^3$, and a third rate 708c of 3.5 $m/s^3$. And four steering rate limits are illustrated, in particular a first rate 710a of 0.1 rad/s, a second rate 710b of 0.2 rad/s, a third rate 710c of 0.3 rad/s and a fourth rate 710d of 0.4 rad/s.

For a given object type, the approach is to stay below the solid line (e.g., 702, 704 or 706). The system can select a combination of steering rate limits (e.g., one of 710a-710d) and lateral jerk curves (e.g., one of 708a-708c) that stays below the solid line. According to one scenario, a single pair of limits (steering rate and steering jerk) act as constraints all the time.

The vehicle's planner module or other part of the onboard processing system may determine, based on various real-time conditions and constraints discussed above, whether to notify the driver to take control of the vehicle. The timing for when the driver should be notified to take control may take into account driver reaction time in addition to other constraints to ensure that the selected minimum lateral gap between the vehicle and the detected object can be maintained. The notification may include one or more of an audible, visual and/or haptic notification.

As noted above, the technology is applicable for various types of self-driving vehicles, including passenger cars, buses, motorcycles, emergency vehicles, RVs, construction vehicles, and large trucks or other cargo carrying vehicles. In addition to using the minimum lateral gap information for operation of an individual self-driving vehicle, relevant information may also be shared with other self-driving vehicles, such as vehicles that are part of a fleet. Such information may include information relating to road surfaces, weather data, etc. For instance, information about objects detected in a particular location (e.g., parked cars, construction vehicles, etc.), road conditions (e.g., road surface type, banking, curvature, etc.), environmental conditions (e.g., precipitation on the roadway, fog or other visibility issues, etc.) may be disseminated to other fleet vehicles.

Figure 8A:
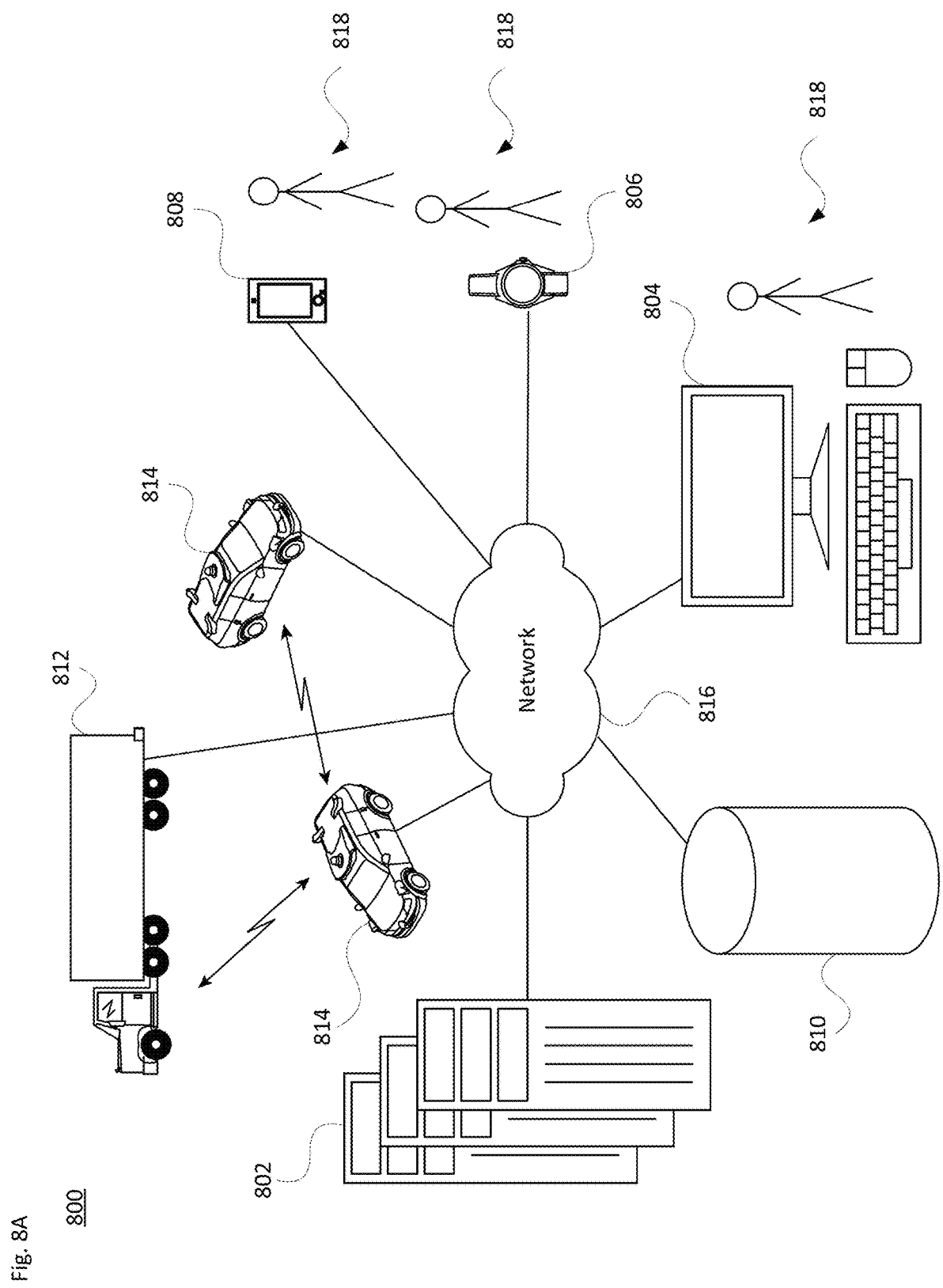
FIGS. 8A-B illustrate an example system in accordance with aspects of the technology.
Figure 8B:
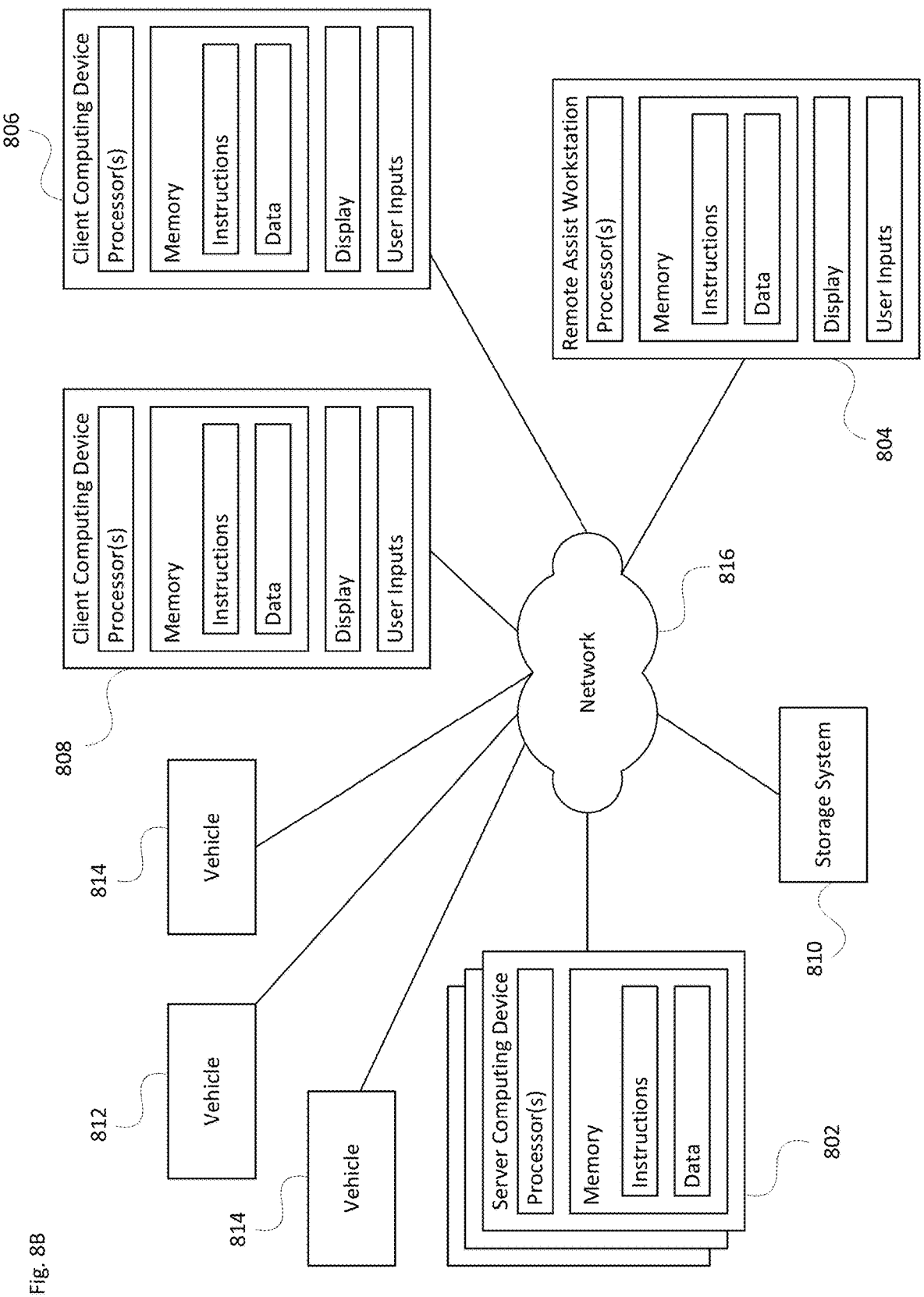

One example of a fleet approach is shown in FIGS. 8A and 8B. In particular, FIGS. 8A and 8B are pictorial and functional diagrams, respectively, of an example system 800 that includes a plurality of computing devices 802, 804, 806, 808 and a storage system 810 connected via a network 816. System 800 also includes vehicles 812 and 814 configured to operate in an autonomous driving mode, which may be configured the same as or similarly to vehicles 100 and 150 of FIGS. 1A-B and 1C-D, respectively. Vehicles 812 and/or vehicles 814 may be part of a fleet of vehicles. Although only a few vehicles and computing devices are depicted for simplicity, a typical system may include significantly more.

As shown in FIG. 8B, each of computing devices 802, 804, 806 and 808 may include one or more processors, memory, data and instructions. Such processors, memories, data and instructions may be configured similarly to the ones described above with regard to FIG. 2 or 3A.

The various computing devices and vehicles may communicate directly or indirectly via one or more networks, such as network 816. The network 816, and intervening nodes, may include various configurations and protocols including short range communication protocols such as Bluetooth™, Bluetooth LE™, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, computing device 802 may include one or more server computing devices having a plurality of computing devices, e.g., a load balanced server farm, that exchange information with different nodes of a network for the purpose of receiving, processing and transmitting the data to and from other computing devices. For instance, computing device 802 may include one or more server computing devices that are capable of communicating with the computing devices of vehicles 812 and/or 814, as well as computing devices 804, 806 and 808 via the network 816. For example, vehicles 812 and/or 814 may be a part of a fleet of self-driving vehicles that can be dispatched by a server computing device to various locations. In this regard, the computing device 802 may function as a dispatching server computing system which can be used to dispatch vehicles to different locations in order to pick up and drop off passengers or to pick up and deliver cargo. In addition, server computing device 802 may use network 816 to transmit and present information to a user of one of the other computing devices or a passenger of a vehicle. In this regard, computing devices 804, 806 and 808 may be considered client computing devices.

As shown in FIG. 8A each client computing device 804, 806 and 808 may be a personal computing device intended for use by a respective user 818, and have all of the components normally used in connection with a personal computing device including a one or more processors (e.g., a central processing unit (CPU)), memory (e.g., RAM and internal hard drives) storing data and instructions, a display (e.g., a monitor having a screen, a touch-screen, a projector, a television, or other device such as a smart watch display that is operable to display information), and user input devices (e.g., a mouse, keyboard, touchscreen or microphone). The client computing devices may also include a camera for recording video streams, speakers, a network interface device, and all of the components used for connecting these elements to one another.

Although the client computing devices may each comprise a full-sized personal computing device, they may alternatively comprise mobile computing devices capable of wirelessly exchanging data with a server over a network such as the Internet. By way of example only, client computing devices 806 and 808 may be mobile phones or devices such as a wireless-enabled PDA, a tablet PC, a wearable computing device (e.g., a smartwatch), or a netbook that is capable of obtaining information via the Internet or other networks. For instance, a smartwatch or other wearable may be used to provide the notification (e.g., audible or haptic) to the driver to take control of the vehicle.

In some examples, client computing device 804 may be a remote assistance workstation used by an administrator or operator to communicate with drivers of dispatched vehicles. Although only a single remote assistance workstation 804 is shown in FIGS. 8A-B, any number of such workstations may be included in a given system. Moreover, although operations workstation is depicted as a desktop-type computer, operations workstations may include various types of personal computing devices such as laptops, netbooks, tablet computers, etc. By way of example, the remote assistance workstation may be used by a technician or other user to help evaluate information that can impact the lateral gap analysis. Such information may be maintained in memory of the remote assistance workstation, the server computing device and/or storage system 810. By way of example, the stored information include vehicle model data for different vehicles of the fleet, tables that compare maneuver steering rates to vehicle speeds, tables for speed-based perception discrepancies, lists of maneuver types (e.g., lateral position correction, braking, acceleration, etc.), driver qualification information (experience, familiarity with vehicle, driver reaction time, etc.), object types, temporal and weather condition information, etc. In one scenario, remote assistance may monitor the rate of object recall (e.g., problems with perception or classification of nearby object) and accordingly cause the vehicle to stop, or to shift to more conservative lateral gaps or tighter steering rate limits.

Storage system 810 can be of any type of computerized storage capable of storing information accessible by the server computing devices 802, such as a hard-drive, memory card, ROM, RAM, DVD, CD-ROM, flash drive and/or tape drive. In addition, storage system 810 may include a distributed storage system where data is stored on a plurality of different storage devices which may be physically located at the same or different geographic locations. Storage system 810 may be connected to the computing devices via the network 816 as shown in FIGS. 8A-B, and/or may be directly connected to or incorporated into any of the computing devices.

FIG. 9 illustrates an example method of operation 900 in accordance with the above discussions. In particular, it provides a method of operating a vehicle configured to operate in one or more autonomous driving modes. At block 902, the method includes determining, by one or more processors of the vehicle, a discrepancy corresponding to a cross-track error for a lateral position of the vehicle. At block 904, the method includes determining, by the one or more processors, an allowed actual gap distance to an object in an environment external to the vehicle. At block 906, a perception error associated with a location of the object in the external environment is determined. At block 908 the method includes determining, based on a combination of the discrepancy corresponding to the cross-track error, the allowed actual gap distance and the perception error, a minimum lateral gap permitted between the vehicle and the object in the external environment. And at block 910, the method includes providing, to a driver of the vehicle, a notification to manually take control over one or more driving operations based on the determined minimum lateral gap.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method comprising:
identifying, by one or more processors, an uncertainty associated with behavior of an object in an environment external to a vehicle while the vehicle is operating in an autonomous driving mode;
estimating, by the one or more processors, a minimum positional gap permitted between the vehicle and the object in the external environment, based on the uncertainty associated with the behavior of the object and at least one of a cross-track error for a lateral position of the vehicle, an allowed actual gap distance to the object in the external environment, or a perception error; and
generating by the one or more processors, a signal regarding one or more driving operations based on the estimated minimum positional gap.

2. The method of claim 1, further comprising identifying, by one or more processors, the perception error, wherein the perception error is associated with a location of the object in the environment external to the vehicle while the vehicle is operating in the autonomous driving mode.

3. The method of claim 2, wherein the perception error is identified in accordance with a speed of the vehicle.

4. The method of claim 2, wherein the perception error is identified in accordance with a relative speed between the vehicle and the object.

5. The method of claim 2, wherein the perception error is identified in accordance with a sensor resolution for a perception system of the vehicle.

6. The method of claim 1, further comprising determining the cross-track error based on a discrepancy between a planned position of the vehicle and an actual position of the vehicle at a point in time along a trajectory of the vehicle.

7. The method of claim 1, wherein estimating the minimum positional gap is performed for a set of possible speed and steering rate limit combinations.

8. The method of claim 7, wherein estimating the minimum positional gap performed for the set of possible speed and steering rate limit combinations is based on at least one of vehicle wheelbase or lateral jerk.

9. The method of claim 1, wherein the allowed actual gap distance is determined according to a maximum lateral deviation permitted that provides for a driver of the vehicle to take over at a particular speed.

10. The method of claim 1, wherein generating the signal regarding the one or more driving operations based on the estimated minimum positional gap includes providing, to a driver of the vehicle, a notification to manually take control over one or more driving operations based on the estimated minimum positional gap.

11. The method of claim 1, wherein the minimum positional gap represents a minimum distance during a disengagement from the autonomous driving mode to a manual driving mode.

12. The method of claim 1, wherein estimating the minimum positional gap further includes evaluating an overlap criterion based on a vehicle model of the vehicle.

13. The method of claim 1, wherein estimating the minimum positional gap further includes evaluating a driving maneuver being performed by the vehicle in the autonomous driving mode.

14. The method of claim 1, wherein estimating the minimum positional gap further includes evaluating driver qualification information.

15. The method of claim 1, wherein estimating the minimum positional gap further includes satisfying a speed-dependent steering rate limit criterion.

16. A system configured to enable operating a vehicle, the system comprising:
memory storing positional gap information associated with vehicle operation; and
one or more processors operatively coupled to the memory, the one or more processors being configured to:
identify an uncertainty associated with behavior of a given object in an external environment while the vehicle is operating in an autonomous driving mode;
estimate a minimum positional gap permitted between the vehicle and the object in the external environment, based on the uncertainty associated with the behavior of the object and at least one of a cross-track error for a lateral position of the vehicle, an allowed actual gap distance to the object in the external environment, or a perception error; and
generate a signal regarding one or more driving operations based on the estimated minimum positional gap.

17. The system of claim 16, wherein the one or more processors are further configured to determine the cross-track error based on a discrepancy between a planned position of the vehicle and an actual position of the vehicle at a point in time along a trajectory of the vehicle.

18. A vehicle configured to operate in one or more autonomous driving modes, the vehicle comprising:
a driving system including a steering subsystem, an acceleration subsystem and a deceleration subsystem to control driving of the vehicle;
a perception system including one or more sensors configured to detect objects in an environment external to the vehicle;
a positioning system configured to determine a current position of the vehicle; and a control system including one or more processors, the control system operatively coupled to the driving system, the perception system and the positioning system, the control system being configured to:

identify an uncertainty associated with behavior of a given one of the objects in the external environment while the vehicle is operating in an autonomous driving mode;

estimate a minimum positional gap permitted between the vehicle and the object in the external environment, based on the uncertainty associated with the behavior of the object and at least one of a cross-track error for a lateral position of the vehicle, an allowed actual gap distance to the object in the external environment, or a perception error; and generate a signal regarding one or more driving operations based on the estimated minimum positional gap.

19. The vehicle of claim 18, wherein generation of the signal regarding the one or more driving operations based on the estimated minimum positional gap includes issuance, to a driver of the vehicle, a notification to manually take control over one or more driving operations based on the estimated minimum positional gap.

20. The vehicle of claim 18, wherein estimation of the minimum positional gap is further based on at least one of:
  evaluation of an overlap criterion based on a vehicle model of the vehicle;
  evaluation of a driving maneuver being performed by the vehicle in the autonomous driving mode;
  evaluation of driver qualification information; or
  satisfaction of a speed-dependent steering rate limit criterion.

\* \* \* \* \*